US010851816B1

(12) United States Patent
Tucker et al.

(10) Patent No.: US 10,851,816 B1
(45) Date of Patent: Dec. 1, 2020

(54) APPARATUS AND METHOD FOR ACTIVE VEHICLE SUSPENSION

(71) Applicant: ClearMotion, Inc., Woburn, MA (US)

(72) Inventors: Clive Tucker, Charlestown, MA (US); Johannes Schneider, Cambridge, MA (US); John Giarratana, Whitman, MA (US); William G. Near, Boston, MA (US); Colin Patrick O'Shea, Cambridge, MA (US); Tyson David Sawyer, Mason, NH (US); Richard Anthony Zuckerman, Somerville, MA (US); Zackary Martin Anderson, Cambridge, MA (US); Marco Giovanardi, Melrose, MA (US); Jack A. Ekchian, Belmont, MA (US)

(73) Assignee: ClearMotion, Inc., Billerica, MA (US)

( * ) Notice: Subject to any disclaimer, the term of this patent is extended or adjusted under 35 U.S.C. 154(b) by 138 days.

(21) Appl. No.: 16/001,804

(22) Filed: Jun. 6, 2018

Related U.S. Application Data

(63) Continuation of application No. 14/801,787, filed on Jul. 16, 2015, now abandoned.

(60) Provisional application No. 62/185,536, filed on Jun. 26, 2015, provisional application No. 62/039,312, filed on Aug. 19, 2014.

(51) Int. Cl.
| | |
|---|---|
| *F15B 21/00* | (2006.01) |
| *F04B 49/10* | (2006.01) |
| *F04B 49/06* | (2006.01) |
| *F04B 49/20* | (2006.01) |

(52) U.S. Cl.
CPC .......... *F15B 21/008* (2013.01); *F04B 49/065* (2013.01); *F04B 49/103* (2013.01); *F04B 49/20* (2013.01)

(58) Field of Classification Search
CPC ...... F15B 21/008; F04B 17/03; F04B 49/065; F04B 49/103; F04B 49/12; F04B 49/20
See application file for complete search history.

(56) References Cited

U.S. PATENT DOCUMENTS

| | | | |
|---|---|---|---|
| 4,883,288 A | 11/1989 | Finn et al. | |
| 4,978,282 A | 12/1990 | Fu et al. | |
| 5,028,073 A | 7/1991 | Harms et al. | |
| 5,165,881 A | 11/1992 | Wicen | |
| 5,329,767 A | 7/1994 | Hewett | |
| 5,682,980 A | 11/1997 | Reybrouck | |
| 6,398,202 B1 | 6/2002 | Schaible | |
| 6,519,939 B1 | 2/2003 | Duff | |
| 7,051,526 B2 | 5/2006 | Geiger | |
| 7,631,736 B2 | 12/2009 | Thies et al. | |
| 8,776,961 B2 | 7/2014 | Mori et al. | |
| 9,108,484 B2 | 8/2015 | Reybrouck | |

(Continued)

FOREIGN PATENT DOCUMENTS

| | | |
|---|---|---|
| DE | 199 20 109 A1 | 11/2000 |
| DE | 10 2004 056610 A1 | 6/2006 |

(Continued)

*Primary Examiner* — Michael Leslie
(74) *Attorney, Agent, or Firm* — Wolf, Greenfield & Sacks, P.C.

(57) ABSTRACT

Method and apparatus for improving the performance, response, and durability of an electro-hydraulic active suspension system. The noise caused by hydraulic flow ripple is reduced and system response is improved.

19 Claims, 33 Drawing Sheets

(56) References Cited

U.S. PATENT DOCUMENTS

| | | | |
|---|---|---|---|
| 9,976,641 B2* | 5/2018 | Caldwell | F03D 7/0296 |
| 2003/0077183 A1 | 4/2003 | Franchet et al. | |
| 2007/0089924 A1 | 4/2007 | de la Torre et al. | |
| 2007/0233279 A1 | 10/2007 | Kazerooni et al. | |
| 2008/0190104 A1 | 8/2008 | Bresie | |
| 2008/0257626 A1 | 10/2008 | Carabelli et al. | |
| 2009/0260935 A1 | 10/2009 | Avadhany et al. | |
| 2010/0072760 A1 | 3/2010 | Anderson et al. | |
| 2010/0262308 A1 | 10/2010 | Anderson et al. | |
| 2012/0224991 A1 | 9/2012 | Lipinski et al. | |
| 2014/0010697 A1 | 1/2014 | Haug | |
| 2014/0265168 A1 | 9/2014 | Giovanardi et al. | |
| 2018/0154728 A1* | 6/2018 | Giovanardi | B60G 17/04 |
| 2018/0209524 A1* | 7/2018 | Dodson | B61C 9/16 |

FOREIGN PATENT DOCUMENTS

| | | | |
|---|---|---|---|
| DE | 10 2010 023434 A1 | 12/2011 | |
| WO | WO 2010/066416 A1 | 6/2010 | |
| WO | WO 2011/159874 A2 | 12/2011 | |
| WO | WO 2014/145018 A2 | 9/2014 | |
| WO | WO-2015040360 A1 * | 3/2015 | F03C 1/0447 |

* cited by examiner

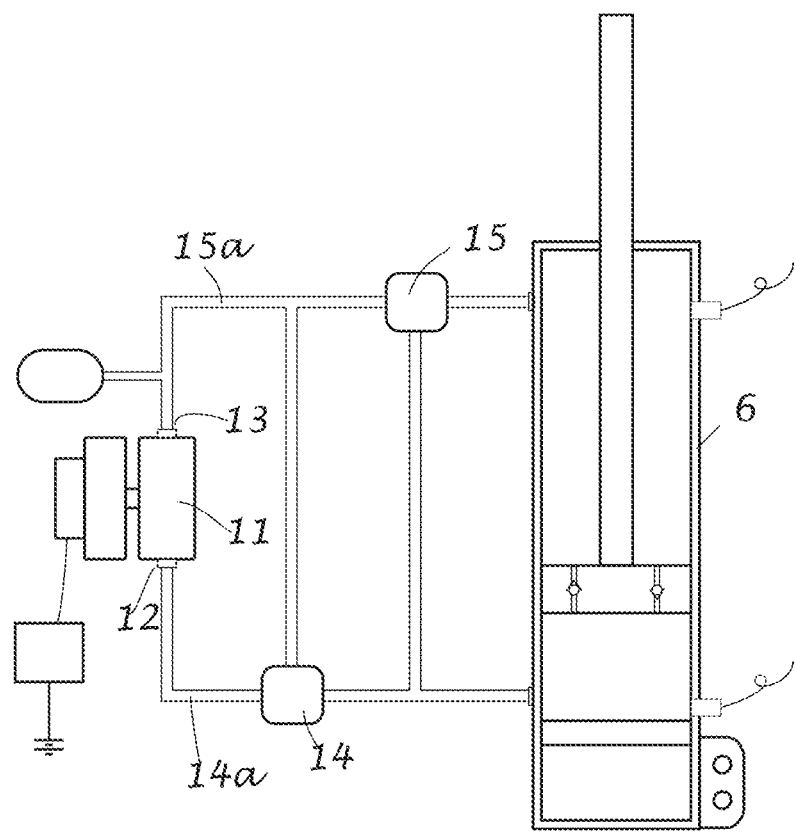

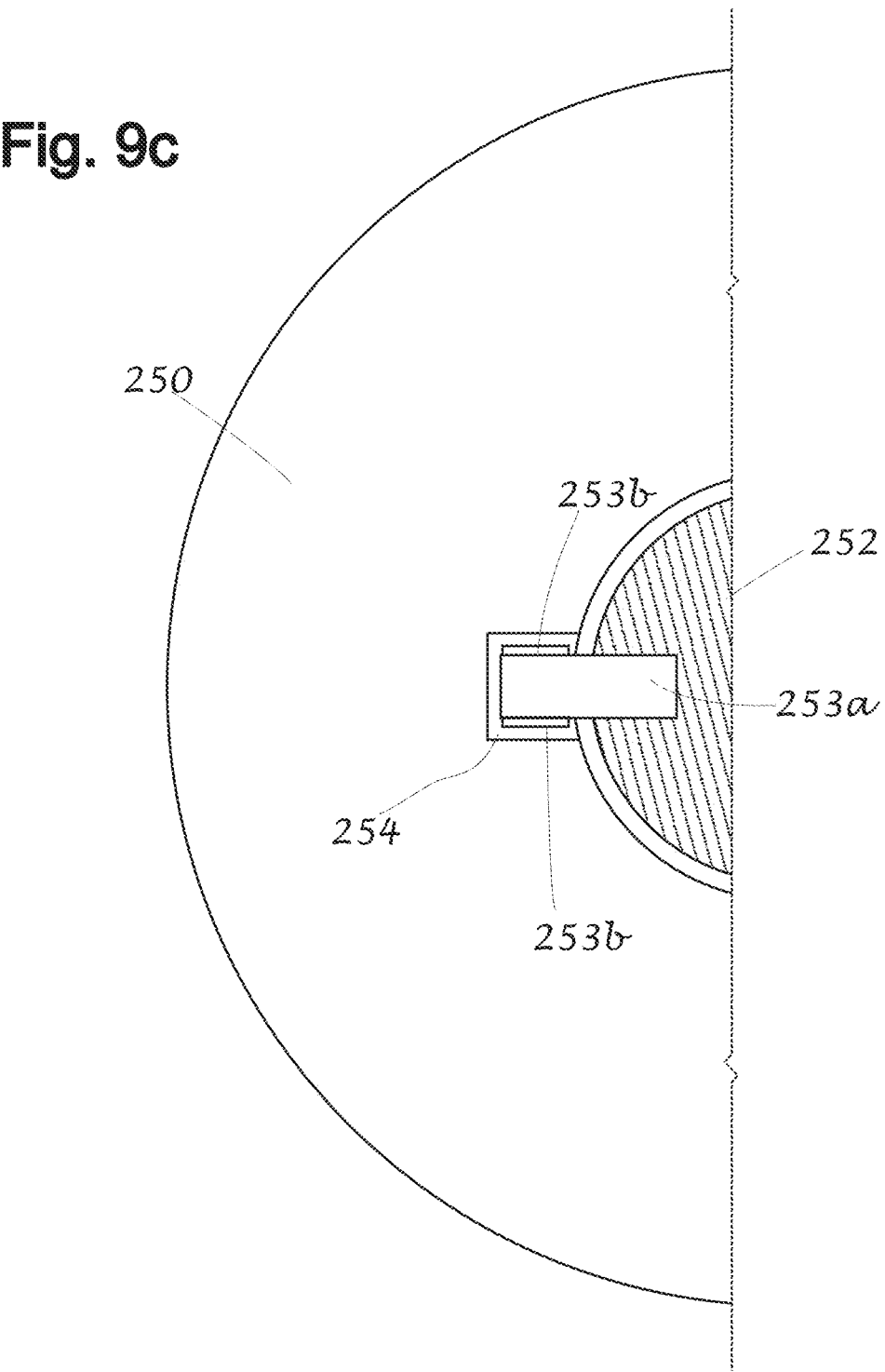

APPARATUS AND METHOD FOR ACTIVE VEHICLE SUSPENSION

CROSS-REFERENCE TO RELATED APPLICATIONS

This application is a Continuation of U.S. application Ser. No. 14/801,787, filed Jul. 16, 2015, which claims the benefit under 35 U.S.C. § 119(e) of U.S. Provisional Application No. 62/185,536 filed Jun. 26, 2015 and U.S. Provisional Application No. 62/039,312 filed Aug. 19, 2014; the contents of each of which are incorporated herein by reference in their entirety.

FIELD

The methods and systems described herein relate to active vehicle suspension systems.

BACKGROUND

Suspension systems are typically designed to properly support and orient a vehicle, provide safe handling in various expected operating environments and ensure a comfortable ride for occupants. Conventional suspension systems are typically passive with largely constant operating and performance parameters. Some suspension systems are semi-active in that their overall response can be adjusted, for example, to offer a trade-off between occupant comfort and vehicle handling. Fully active suspension systems use actuators to react automatically to changing road conditions by relying on input from sensors and other measurement devices.

The operation of conventional suspension systems is, to a great degree, determined by the performance of the shock absorbers and associated springs. Shock absorbers are commonly configured as hydraulic dampers that are interposed between the vehicle body and each of the wheels and configured to dissipate the energy of oscillations imparted to a moving vehicle. A typical shock absorber comprises a piston slideably received in a housing that is at least partially filled with hydraulic fluid. The housing is separated into a compression volume and an expansion (or rebound) volume by the piston that is attached to a piston rod. When the piston travels into the housing, the compression volume is reduced in size while the expansion volume grows. These changes in volume are reversed when the piston travels in the opposite direction.

In active suspension systems, the shock absorber may be converted into a hydraulic actuator that can be operated in both a damping mode and a driving mode. In the damping mode, the actuator can apply a force that resists the motion imparted to a vehicle wheel as a vehicle travels on a road, for example, caused by an irregularity in the road surface. In the "driving" mode, the actuator applies a force that assists the motion of the piston. The actuator may be operated in a damping mode or a driving mode whether the actuator is being compressed or expanded. The actuator operates as a part of a hydraulic system that delivers or removes a requisite amount of hydraulic fluid from the compression and expansion volumes while maintaining a desired pressure in each.

SUMMARY

Hydraulic pumps may be used to cause hydraulic fluid to flow through a hydraulic circuit while hydraulic motors may also be used to extract energy from the flow. Frequently, the same component can be used as a pump as well as a motor. Such hydraulic motor/pumps (HMPs) are typically connected to generator/electric motors (GEMs) that can drive the HMP as well as absorb energy from it.

Positive displacement HMPs are used in hydraulic systems because their rate of throughput is substantially proportional to their speed and largely independent of pressure over their operating range. Therefore, the flow rates in the hydraulic circuit can be effectively and accurately controlled by controlling the HMP speed. Unfortunately, positive displacement HMPs typically may suffer from higher frictional losses, higher noise and pressure fluctuations.

Hydraulic systems, such as for example, those using gerotors, have difficulty in situations when significant forces have to be developed rapidly while operating the HMP over a very broad range of speed with frequent direction reversal. Conventional HMPs, even conventional gerotors, are typically used in situations where efficiency, rapid response, and leakage are not key considerations. For example, conventional gerotors are typically comprised of steel rotors that are fabricated using metal powder technology. The thin-film lubrication, which is typically used between the outer gerotor rotor and the housing can break down at low speeds, especially when direction reversal occurs.

In order for an HMP to be effective in a fully active suspension system, it must have high efficiency, be sufficiently rugged, and be low cost. To be used in a distributed active suspension system, where at least one HMP is used at each corner of the vehicle, the HMP must also be compact and lightweight.

In one embodiment an active or semi-active vehicle suspension system is provided. At least four independent actuators may be used that are located at the four corners of a vehicle. In another embodiment, each actuator is configured as an integrated unit comprising an HMP, a GEM and/or a local electronic controller (LEC) integrated with or within the housing of the actuator. In yet another embodiment, the HMP is a positive displacement device. Positive displacement HMPs provide improved torque repeatability, and control over a wide range of pressures and fluid flow rates in both driving and damping modes. Various types of positive displacement HMPs may be used such as, for example, a gerotor, an external gear, or bent axis units. A gerotor-based HMP may be used to provide improved backdrivability, simplicity, packaging, and cost advantages.

The gerotor is a positive displacement HMP consisting of two elements: an inner rotor and an outer rotor. The outer rotor has one more lobe or tooth than the inner rotor and has its centerline positioned at a fixed eccentricity from the centerline of the inner rotor and shaft. Gerotors use the principle of conjugately generated lobe profiles to provide continuous substantially fluid-tight sealing during operation. As the rotors rotate about their respective axes, fluid enters a chamber, bound by the inner and outer rotors, and in communication with an intake port, that grows to a maximum volume. As rotation continues, the chamber comes into communication with an exhaust port and the volume decreases, forcing fluid out of the chamber. The process occurs constantly for each chamber, providing a substantially smooth pumping action.

A positive displacement HMP may be used effectively in all four quadrants of the force/velocity domain to actively drive or damp the motion of the actuator piston during both compression and extension modes of the operation. Many different types of positive displacement HMPs may be used to operate a hydraulic actuator, such as for example, the gerotor.

In the gerotor-based active suspension system, the gerotor may experience rapid speed reversals and high accelerations. It is, therefore, desirable to minimize the mass of both the inner and outer gerotor rotors to reduce inertial effects. Because of their high inertia, conventional steel gerotors increase the system's response time. Thus, "lightweight materials" may be used to reduce inertia and response time. Lightweight materials may be used which exhibit high durability and wear resistance, low coefficient of thermal expansion (for example, comparable to the coefficient of expansion of aluminum), hydraulic oil compatibility over the entire operating temperature range, and suitability for mass production. Lightweight materials include materials with densities in the range approximately from the density of plastics, such as for example Meldin, to the density aluminum or lower.

Internal stresses on the components of a gerotor pump are relatively low and the minimum yield strength of the materials used is therefore also low. For example the yield strength of performance plastics may be sufficient for certain applications, such as active suspension systems. The inventors have recognized and appreciated that one or both rotors of a gerotor pump used in applications, such as for example, active suspension system, may be manufactured from plastics. Both the inner and outer gerotors are normally fully immersed in a hydraulic fluid during operation.

It is not necessary that the same material be used for both the inner and outer rotor of a HMP such as a gerotor. For example, a high performance plastic may be used for the inner element and P/M Aluminum (hard anodized) for the outer element. However, a high performance plastic may be used to manufacture the outer element. In embodiments, injection molded fiber-filled performance plastic may be used to manufacture either or both the inner and outer rotors.

In some embodiments, the rotors of the gerotor may be manufactured by using an injection molding process. The inventors have recognized and appreciated that by using the injection molding process to manufacture gerotor components from plastic with fiberfill, the yield strength of the material can be increased relative to, for example, that of extruded rod stock. In any case, it should be understood that any of the components of a HMP may be made from any appropriate material as the disclosure is not limited to only those materials described above.

Typically an HMP exchanges energy rotationally with a GEM by means of a shaft. A component of an HMP is frequently connected to the shaft by a torque-transferring element, such as for example a key, and rotates relative to other components within the HMP. In embodiments the interface between the shaft and the HMP component attached to the shaft may be substantially torsionally stiff. A substantially torsionally stiff interface is defined as an interface that transmits torque over the operating range of the HMP with minimal, typically less than 0.4 degrees, relative angular displacement between the shaft and the HMP component attached to it. In embodiments the interface between the HMP shaft and the component driven by the shaft may be floating in one or more planes or directions. A floating interface is defined as an interface where a rotating element is connected to a shaft in a manner where torque is transferred between the shaft and the rotating element while the rotating element has latitude to move in at least one plane or direction, other than the torsional plane, relative to the shaft.

The outer rotor of a gerotor may be attached to a shaft while the inner rotor is rotationally supported by the gerotor housing. Alternatively, the inner rotor may be attached to the shaft while the outer rotor is rotationally supported by the gerotor housing. This arrangement typically results in a lower overall rotational moment of inertia. In applications, such as for example, a gerotor based active suspension system, the gerotor may experience rapid speed reversals and high accelerations.

In a gerotor based HMP, the inner rotor may be attached to the shaft of the HMP. The inner rotor and the shaft may be distinct components and their interface may comprise a torque-transferring element, such as for example, a Woodruff key, a tapered key, a parallel key, an articulating key, a spline or a barrel spline. Alternatively, the shaft and inner rotor may be manufactured as a unitary component or be fused together. An articulating key is a pin-block assembly, configured with a linear element that is engaged in a slot in the rotor but is free to rotate about an axis parallel to a shaft radius.

In embodiments, the shaft/rotor interface may be a floating interface in at least one direction or plane, such as for example, in the axial direction or in a twisting direction. Twisting direction is defined as the rotation of the element connected to the shaft about a transverse axis parallel to a radius of the shaft. In some embodiments, a floating shaft/rotor interface may be substantially torsionally stiff. The shaft/rotor interface may be self-adjustable in at least one plane or direction other than the torsional direction. Self-adjustable is defined as a configuration where the rotor attached to the shaft can move relative to the shaft, in at least one plane, during operation and/or assembly to accommodate dimensional inconsistencies or misalignment between the shaft and various components of the gerotor assembly. Interface between the shaft and the inner rotor may simultaneously be torsionally stiff and self-adjustable in at least one other plane or direction.

A self-adjusting rotor may be used to effectively transmit torque and withstand radial forces, such as for example, due to a pressure imbalance while accommodating slight misalignment between the gerotor elements, the housing and the shaft.

Alternatively or additionally the shaft may be attached to the inner gerotor element with a flexible disc. The flexible disc may be torsionally rigid but permit limited axial or tilting motion of the rotor with respect to the shaft.

Alternatively or additionally, the shaft may be connected to the inner gerotor element by a constant velocity joint, for example, comprising v-shaped grooves on the inner rotor and corresponding yet inverted v-shaped grooves on the shaft, which contain ball bearings. This system is torsionally stiff and can carry a radial load while the bearings can move along the grooves to allow the gerotor to adjust in the axial or tilt directions with respect to the shaft.

Alternatively or additionally, the shaft attached to the inner gerotor and one or more bearings and/or the gerotor housing may be adjustable in the axial or twisting directions to accommodate inconsistencies or misalignment between the shaft and various components of the gerotor assembly.

An HMP component, such as for example the inner rotor of a gerotor, that is attached to a shaft with a torque-transferring element may be manufactured from a plastic or other relatively soft material as compared to metals (such as for example steel or aluminum). An insert may be incorporated in the HMP component to provide, for example, a more robust bearing surface to engage the torque-transferring element. The insert may be constructed from a material with a high yield strength such as for example steel. The insert may be incorporated in the structure of the HMP component by using a process such as over-molding.

Certain materials, such as various plastics, may be quite abrasive. When one or both of the rotors of a gerotor are at least partially manufactured from abrasive materials, components that they come into contact with are coated with a hardened, wear-resistant material. For example, aluminum components may be anodized. Alternatively or additionally, chemical vapor deposition (CVD) or plasma vapor deposition (PVD) processes may be used to add a wear-resistant coating, such as for example, a nitride, oxide, carbide, or boride coating. Alternatively or additionally, a compliant material may be added as a coating to at least a portion of the torque-transferring element. A compliant material is a material that has a lower strain to stress ratio than the material from which the rotor, shaft, or torque-transferring element is made. This compliant material may be, for example, polytetrafluoroethylene (Teflon®). Alternatively or additionally, when one or both of the rotors are at least partially manufactured from abrasive materials, those components may be coated with a low friction material. Certain surfaces of the rotor, such as a face perpendicular to the shaft, may be made oleophobic.

In embodiments, a keyway design may be used to minimize stress concentrations in, for example, the inner rotor of a gerotor HMP. Stress concentrations may be reduced by incorporating much larger fillets in the keyway. In a conventional keyway, the fillets may be approximately 0.005 inches to 0.010 inches in radius. One or more fillets may be greater than 0.010 inches in radius. Alternatively, the fillet radius may be greater than or equal to 0.050 inches or greater than 0.100 inches. Such increases in one or more fillet radii will increase durability of the rotary element and/or the likelihood that it will split or crack. In a traditional rectangular shaped keyway, excessive stress concentrations may be present at one or more of the sharp corners of the keyway.

In some embodiments, the keyway is aligned with the point where the rotary element has the maximum radial thickness to absorb stresses generated by the keyway.

It is not required that the keyway extend to the full axial thickness of the rotary element. The axial length of the keyway may be no longer than is necessary to support the transferred load. If the keyway does not extend to the full axial thickness of the rotary element, the blind end of the keyway may also be rounded so that sharp internal corners are avoided to the greatest degree possible. Limiting the axial length of the keyway avoids unnecessarily weakening the rotary element.

The rounded keyway may be created using a tool, such as for example, and an end mill, a ball end mill or a custom round profile broaching tool. Alternatively, the keyway may be formed by, for example, injection molding or casting if the material used can be formed by using such processes.

According to one aspect, a key and the corresponding keyway are designed to provide expanded engagement depth in the shaft. A key with expanded engagement depth penetrates radially into the shaft by an amount that is in excess of the engagement that is typically necessary to transmit the design torque. A key and keyway combination with expanded engagement depth will be more securely retained in the shaft under high torque and high acceleration conditions.

According to another aspect, the key and keyway in the shaft are configured to be in a line-to-line fit, or alternatively in a transition fit or an interference fit. According to still another aspect the key and keyway fit in the rotary element is configured to be a clearance fit.

In some embodiments it may be desirable to reduce noise induced in a vehicle body due to pressure oscillations in the hydraulic circuit caused by the HMP. These oscillations are objectionable because they may be transmitted through, for example, the piston rod of the actuator piston to the vehicle body by means of the top mount of the shock absorber or actuator. However, the effect of such oscillations that are produced may be mitigated by using passive or active shock absorber mounts capable of damping such oscillations.

In one embodiment, noise induced in the vehicle by an active or semi-active suspension system may be reduced by using a specially designed gerotor-based HMP in the actuator hydraulic circuit. In other embodiments, it may be desirable to reduce noise produced in the vehicle by an active or semi-active suspension system by limiting the operation of the HMP so that certain noise inducing torque/speed combinations are minimized.

In another embodiment, noise induced in the vehicle by an active or semi-active suspension system may be reduced by providing the hydraulic circuit with an HMP with two or more reservoirs, buffers or accumulators. At least one of the reservoirs, buffers or accumulators may comprise a material that is more compressible than the hydraulic fluid being used. In embodiments, the compressible material is a gas.

The hydraulic circuit of an active and semi-active system typically has at least a first reservoir to accommodate the differential between the change in hydraulic fluid capacity of the compression volume compared to change in hydraulic fluid capacity of the expansion volume as the piston moves. This differential is a result of the volume displaced by the piston rod. This first reservoir may also accommodate excess hydraulic fluid volume due to thermal expansion or compensate for the deficit in hydraulic fluid resulting from thermal contraction. In situations where a piston rod, with the same cross sectional area, is attached to each of the two faces of the piston, there is no such volume differential, and the reservoir must typically only accommodate fluid expansion or contraction. The first reservoir may be in fluid communication with the compression volume of the actuator.

At least one additional reservoir or buffer may be added that is in fluid communication with the expansion volume. This second reservoir may be used to dampen or filter out pressure fluctuations in the hydraulic circuit and reduce noise in the vehicle. In embodiments, the first and additional reservoirs may not be in communication with the same actuator (compression or expansion) volume.

In one embodiment, it may be desirable to reduce or minimize the overall inertia of the hydraulic circuit. The inertia of the HMP may represent a significant portion of the inertia of the hydraulic system.

In yet another embodiment, it may be desirable to reduce the inertia of a gerotor by using rotors fabricated from plastic. The gerotor elements may be fabricated using an injection molding process. Inertia may also be reduced by incorporating holes, such as axial holes, in the inner and/or outer rotors. Such holes may also be used to securely grip the rotors during manufacture and to also minimize axial pressure differential across the gerotor during operation. In addition, they may improve the injection molding process.

Vibration induced noise is a problem in many vehicle systems with components that move at high velocities because the vehicle body components may act as resonators and amplify vibration and produce noise. In an active suspension system, an HMP, such as for example a gerotor, can induce resonance in a wide array of vehicle components through operation at certain angular speeds. Because active suspension systems may operate in all four quadrants of the force/velocity domain (analogous to a torque/angular velocity domain), a continuous and broad spectrum of excitation frequencies are typically present.

In one embodiment, it may be desirable to attenuate or eliminate noise at certain frequencies by using a torque avoidance strategy. By using this strategy, noise from an active suspension system, due to resonance of various vehicle components, may be reduced. The system identifies torque/speed combinations that are problematic and likely to induce elevated noise levels. Once identified, the system institutes a strategy that avoids these combinations, minimizes their frequency of occurrence, or minimizes the length of time that is spent at a given combination. Such a torque avoidance system may be used with several types of actuators including hydraulic actuators such as those featuring a HMP/GEM, linear electric motors, ball screw mechanisms, and other active suspension configurations that feature an electric motor.

A method is described where "smart limits" are used to reduce noise created due to resonances in the vehicle. These smart limits can be prioritized and/or ignored based on other system or vehicle priorities such as, for example, safety or other torque limiting conditions or based on operator preferences. When the torque command system requests a torque/angular speed combination from the HMP/GEM, which would result in the excitation of a resonance frequency somewhere in the vehicle, the frequency attenuation algorithm would modify the torque request to fit within an acceptable torque/speed envelope. If a particular condition exists that would prevent the selection of a desirable torque/speed combination, the least objectionable alternative may be chosen.

In one embodiment, it may be desirable to utilize passive damping to attenuate vibrations induced in the active suspension actuators. Such vibrations be attenuated before they are communicated to the vehicle body. Problematic vibrations, generated in active suspension systems that may lead to objectionable audible noise, are frequently concentrated in certain frequency bands. Passive damping mechanisms may be tuned to these problematic frequencies. The vibrations may be damped at a point where the suspension system actuators are attached to the vehicle body, such as for example, at the top mounts position typically used to attach shock absorbers to the vehicle body.

In an embodiment, a top mount tuned mass damping system is used to reduce noise and vibration transmitted to a vehicle body by the suspension system. The system includes a first intervening damping/spring device interposed between the actuator piston and a second mass, and a second intervening damping/spring device interposed between the vehicle body component and the second mass. The second mass may be a top mount bracket. The system forms a tuned mass damper that may be tuned to reduce noise and vibration across various frequency bands. In some embodiments, the frequency bands where noise and vibration may be reduced by using a tuned mass damping system are, for example, 200 Hz-1.3 kHz, 400-600 Hz or 1.3 kHz to 2 kHz range. The actuator in the system may be an active damper, such as for example, an electro-hydraulic damper, an electro-mechanical damper or and electro-magnetic damper. Damping/spring devices are members, such as for example, washers that have the desired damping performance and spring constant. Materials that may be used in manufacturing damping/spring devices include, for example, various rubbers and visco-elastic polymers that have the desired loss modulus. Examples of materials that may be used include ISODAMP C-8002® and the ISODAMP® C-1000 materials made by EAR and Sorbothane® manufactured by Sorbothane, Inc.

In another embodiment, a gerotor motor/pump unit includes a housing with a cylindrical inner surface, a gerotor with an inner rotor and an outer rotor located in the housing. A rolling element, such as for example, a ball bearing is located between the outer surface of the outer rotor and the housing.

In yet another embodiment a gerotor motor/pump unit includes a housing, an outer rotor, with a plurality of internal lobes and a cylindrically shaped outer surface that is rotatably received in the housing. It also includes an inner rotor attached to a shaft that engages the outer rotor. The inner rotor has a plurality of external lobes that is one less in number than the number of internal lobes of the outer rotor. In the embodiment the inner rotor is constructed at least partially from a plastic material. Alternatively or additionally, the inner rotor may constructed to include at least a second material. In some embodiments the inner rotor may be constructed by over molding an outer ring of plastic, over a hub that has an axial opening that receives the shaft. In some embodiments the hub may have outer teeth that are covered with plastic in the injection over molding process for manufacturing the internal rotor. The one or more of the hub teeth may be aligned with one or more of the inner rotor lobes.

U.S. patent application Ser. No. 12/534,629 entitled "REGENERATIVE SHOCK ABSORBER SYSTEM", filed Aug. 3, 2009, U.S. patent application Ser. No. 13/759,467 entitled "INTEGRATED ENERGY GENERATING DAMPER", filed Feb. 5, 2013, U.S. patent application Ser. No. 14/212,431 entitled "VEHICULAR HIGH POWER ELECTRICAL SYSTEM", filed Mar. 14, 2014, U.S. patent application Ser. No. 14/213,491 entitled "SYSTEM AND METHOD FOR USING VOLTAGE BUS LEVELS TO SIGNAL SYSTEM CONDITIONS" filed Mar. 14, 2014, PCT application serial number PCT/US2014/027389 entitled "MULTI-PATH FLUID DIVERTER VALVE" filed Mar. 14, 2014, U.S. patent application Ser. No. 14/242,612 entitled "CONTACTLESS SENSING OF A FLUID-IMMERSED ELECTRIC MOTOR", filed Apr. 1, 2014, U.S. patent application Ser. No. 14/242,636 entitled "ACTIVE ADAPTIVE HYDRAULIC RIPPLE CANCELLATION ALGORITHM AND SYSTEM", filed Apr. 1, 2014, U.S. patent application Ser. No. 14/242,705 entitled "DISTRIBUTED ACTIVE SUSPENSION CONTROL SYSTEM", filed Apr. 1, 2014, PCT application serial number PCT/US2014/029654 entitled "ACTIVE VEHICLE SUSPENSION IMPROVEMENTS", filed Mar. 14, 2014, and PCT application serial number PCT/US2014/029942 entitled "VEHICULAR HIGH POWER ELECTRICAL SYSTEM AND SYSTEM AND METHOD FOR USING VOLTAGE BUS LEVELS TO SIGNAL SYSTEM CONDITIONS", filed Mar. 15, 2014, describe active suspension systems, the contents of all of which are incorporated herein by reference in their entirety.

While the various embodiments described herein have been described mostly using the example of hydraulic motors for active suspension systems, it will be understood by one of ordinary skill in the art that the various components and methods described herein may be applied to many other types of motors and mechanical devices, rotary or linear, as well as those outside of the automotive industry. In fact, the current disclosure may be applied in any situation where the value of any fluctuating quantity needs to be monitored on a regular basis by using one or more sensors.

It should be appreciated that the foregoing concepts, and additional concepts discussed below, may be arranged in any suitable combination, as the present disclosure is not limited in this respect. It should be further understood, however, that the disclosure is not limited to the precise arrangements, variants, structures, features, embodiments, aspects, methods, advantages, improvements, and instrumentalities shown and/or described. Instead, they may be used singularly in the system or method or may be used in combination with other arrangements, variants, structures, features, embodiment, aspects, methods, and instrumentalities. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference herein include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIGS. 1e, 1f, and 1g illustrate alternative arrangements of hydraulic fluid conduits of the active suspension system of FIG. 1a.

FIG. 9c illustrates a partially sectioned view of a shaft/rotor interface with a padded torque-transferring element engaged in a slot in a rotor.

FIG. 11b illustrates a perspective view of an inner rotor of a gerotor configured to slideably receive the shaft in FIG. 11a.

DETAILED DESCRIPTION

Certain exemplary embodiments will now be described to provide an overall understanding of the principles of the structure, function, manufacture, and use of the system and methods disclosed herein for an active suspension system. One or more examples of these embodiments are illustrated in the accompanying drawings and described herein. Those of ordinary skill in the art will understand that the systems, methods, and examples described herein and illustrated in the accompanying drawings are non-limiting exemplary embodiments and that the scope of the present disclosure is defined solely by the claims. The features illustrated or described in connection with one exemplary embodiment may be combined with features of other embodiments and that these features may be used individually, singularly and/or in various combinations. Such modifications are intended to be included within the scope of the present disclosure.

Figure 1A:
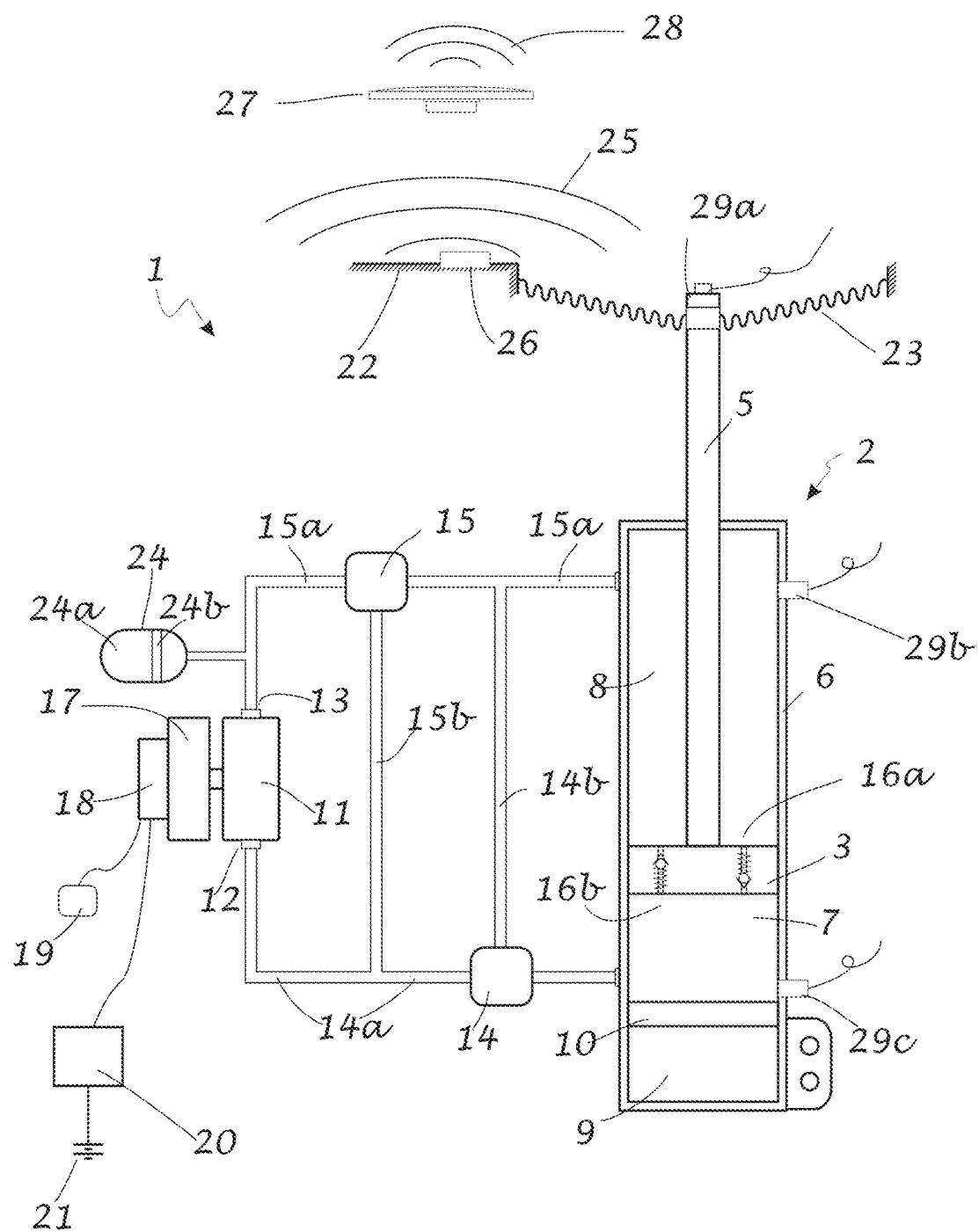
FIG. 1a is an illustration of an embodiment of an active suspension system with actuator, HMP and noise cancellation.

FIG. 1a illustrates an aspect of an embodiment of the hydraulic circuit of an active suspension system 1 comprising an actuator 2 which includes piston 3 with piston rod 5. Piston 3 is slideably received in actuator housing 6 and divides its internal volume into compression volume 7 and expansion volume 8. The compression volume is compressed by the piston when the piston is moved further into the housing while the expansion volume is compressed when the piston is pulled out of the housing. Accumulator (reservoir) 9 may be incorporated in actuator housing 6 and separated from compression volume 7 by floating piston 10. An additional or alternative accumulator may be incorporated in the upper portion of actuator housing 6 and be separated from expansion volume 8 by an annular piston (not shown). An accumulator may also be located external to the actuator housing 6 and configured to be in fluid communication with the compression volume or the expansion volume. Accumulator 9 may be used to accommodate fluid expansion or contraction as a result of, for example, temperature change as well as the differential between the change in hydraulic fluid capacity of the compression volume compared to change in hydraulic fluid capacity of the expansion volume as a result of the motion of the piston.

The hydraulic circuit of an active suspension system 1 further comprises a hydraulic motor pump (HMP) 11 with a first port 12 and a second port 13. The HMP may be a positive displacement device so that the piston 3 and the HMP may move substantially in lockstep with each other. In this arrangement, the movement of the actuator piston 3 can be controlled more effectively in both absorbing and driving modes. In some embodiments the HMP is a gerotor. A gerotor-based HMP, incorporated in the system in FIG. 1a, will move largely in lockstep with the piston, i.e. the angular velocity of the gerotor will be substantially directly proportional to the velocity of the actuator piston over the desired operating range of the gerotor. Therefore, in this arrangement it is possible to effectively, reliably and accurately control the motion of the piston by controlling the rotational motion of the gerotor. However, embodiments in which the HMP does not move in lockstep with the piston, at least at some operating points of the system, are also contemplated.

FIG. 1a illustrates the use of bypass valves to prevent damage to the HMP due to over-speeding. For example, if the actuator 2 is being compressed at an excessive rate, at least a portion of the fluid flowing out of the compression volume 7 may be bypassed so that it flows directly into the expansion volume 8 without passing through the HMP. Fluid flowing out of the compression volume may be bypassed by bypass valve 14. Fluid flowing out of the expansion volume may be bypassed by bypass valve 15. First port 12 of the HMP is in fluid communication with bypass valve 14 by means of conduit 14a. Second port 13 of the HMP is in fluid communication with second bypass valve 15 by means of conduit 15a. Bypass valve 14 and bypass valve 15 are also in fluid communication with compression volume 7 and expansion volume 8, respectively. When bypass valve 14 is actuated, at least a portion of a fluid flow leaving compression volume 7 is diverted back into expansion volume 8 by means of conduit 14b. When bypass valve 15 is actuated, at least a portion of a fluid flow leaving expansion volume 8 is diverted back to compression volume 7 by means of conduit 15b. The bypass valves 14 and 15 may be passive diverter valves that are self-actuated when the velocities in conduits 14a and 15a, respectively, reach a certain threshold velocity. In embodiments the operation of the diverter valves may be substantially independent of fluid pressure. In embodiments, the operation of the diverter valves be completely independent of fluid pressure. In embodiments, the valves 14 and 15 may be progressively damped bypass valves wherein the amount of fluid being bypassed is proportional to the flow rate of fluid entering the valve that is in excess of a threshold value. In FIG. 1a, the bypass valves are shown to be external to actuator housing 6. One or both of these valves may be integrated with the housing.

Additionally or alternatively, blow-off valves may be used to prevent an over-pressure condition in the housing. For example, blow-off valve 16a may be used to limit the maximum pressure in the compression volume 7, while blow-off valve 16b may be used to limit the maximum pressure in the compression volume 8. Any convenient blow-off valve may be used including, for example, a spring-loaded check valve or a preloaded shim stack.

In the depicted embodiment, a HMP 11 is operatively coupled with a generator/electric motor (GEM) 17, which is used to both drive the HMP when it needs to be operated as a pump or to absorb power when the HMP is functioning as a motor. The GEM may be a BLDC (brushless DC) motor although any convenient electric motor/generator may be used such as, for example, axial field motor/generators, induction motor/generator, switched reluctance motor/generators, and brushed motors. The GEM 17 may also be integrated with the HMP by, for example, embedding magnets and/or electric coils in the inner or outer rotors of a gerotor-based HMP.

In some embodiments it may be advantageous to have a local controller in close proximity to the GEM in order to, for example, minimize communication delays. Local electronic controller (LEC) 18 is used to operate the GEM in response to various measurements and the output of internal and/or external sensors. The LEC may comprise, for example, a local data processor, data storage, and sensors as well as energy storage such as, for example, batteries and/or capacitors. It may be configured to operate, at least occasionally, independently of centralized power storage and control. The LEC 18 may also operate as part of a network and deliver data to and/or receive data from a vehicle control unit 19, vehicle sensors, communication systems, and one or more other active suspension systems. The controller may also exchange information and electric power with a centralized controller and energy storage/conditioning device 20 which may comprise, for example, a power storage capacitor, a battery, and a DC-DC voltage converter and power management systems. The centralized controller and energy storage/conditioning device 20 may be configured to exchange electrical energy with a vehicle power storage device 21 such as, for example, a battery, a capacitor, or a flywheel.

Typically an HMP, especially if it is a constant displacement device, will induce pressure ripple in the hydraulic circuit. This ripple may cause oscillations, for example, in piston 3, which may be transferred to vehicle body components 22 by means of, for example, the top mount 23. A buffer 24 may be used to attenuate the pressure ripple. The buffer 24 may be in fluid communication with the hydraulic circuit at a point that is in close proximity to the HMP port that is furthest from the accumulator 9. The buffer 24 is at least partially filled with a compressible material 24a that is more compressible than the hydraulic fluid used in the hydraulic circuit. The compressible material 24a may be a gas, such as for example, nitrogen. Alternatively or additionally, the compressible material may be comprised of, for example, closed-cell foam. The compressible material may be separated from the hydraulic fluid by, for example, piston 24b, or a flexible diaphragm (not shown). Alternatively the compressible material may be sealed in a flexible bladder (not shown).

Multiple buffers may be utilized at various points in the hydraulic circuit. The stiffness of these buffers may be sufficient so as not to detract from the system response, but not so high that there is insufficient attenuation of the induced pressure ripple. Multiple buffers with different degrees of stiffness may be used so as to achieve desired performance at various operating conditions by limiting variability of system stiffness.

In instances where induced pressure ripple has not been sufficiently attenuated in the hydraulic system, it may result in vibrations in various body components 22 that may radiate audible sound 25. The vibrations in body components may be attenuated by using active or passive vibration dampers 26. Another way of attenuating the sound caused by the noted vibrations is to use radiated audible sound 25. The radiated audible sound may be provided by using speaker 27 in a noise cancelling arrangement to achieve reduced noise 28. The speakers of the vehicle entertainment system may be used for noise cancellation. The noise cancellation system using speaker 27 may be driven using noise or vibration data collected by various sensors, such as for example, microphones (not shown) and/or accelerometer 29a. Alternatively or additionally, information about the operating parameters of an HMP, such as, the instantaneous torque produced or absorbed by an HMP (for example of a gerotor) and/or its angular speed or position may be used in conjunction with the transfer function of the vehicle body to control the operation of the speaker for noise cancellation.

Additionally or alternatively, the relative phasing of two or more HMPs in a vehicle may be changed in order to achieve cancellation of vibration in a given body component 22 induced by these multiple HMPs.

Various sensors may be used to measure various performance and environmental parameters for control and diagnostic purposes. For example, an accelerometer 29a may be used to measure the displacement of and vibration in the piston rod 5. Pressure sensors 29b and 29c may be used to measure the pressure in the expansion volume 8 and compression volume 7 respectively.

In embodiments two or more system components, for example, actuator 2, HMP 11, GEM 17, LEC 18, bypass valves 14 and 15, and/or buffer 24 may be consolidated in a unit or single housing located at each of the four corners of a vehicle.

Figure 1B:
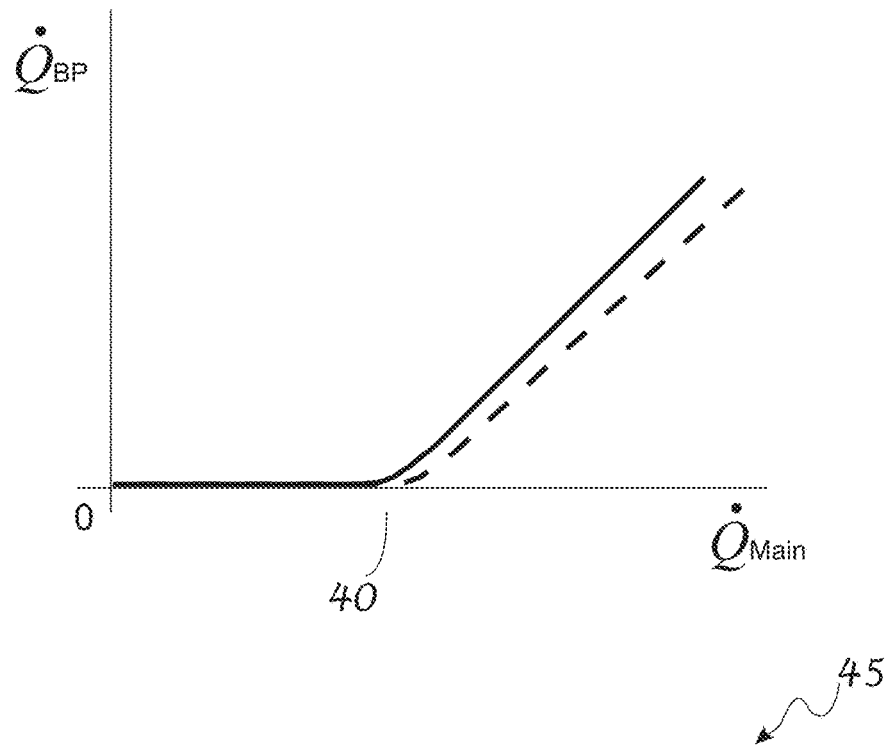
FIG. 1b shows a graph of the main flow and bypass flow in an embodiment of a diverter valve.

FIG. 1b illustrates the operation of a progressively damped passive bypass valve where $\dot{Q}_{Main}$ is the flow rate of the main flow entering the bypass valve and $\dot{Q}_{BP}$ is the flow rate of the bypassed flow. The valve is activated when $\dot{Q}_{Main}$ exceeds threshold 40. The threshold 40 may substantially be a function of $\dot{Q}_{Main}$ and independent of pressure. In embodiments, the threshold 40 may be independent of hydraulic pressure. As the flow rate entering the bypass valve increases, the bypassed flow also increases (shown by dashed line) limiting the amount of fluid flowing past the valve. The bypassed flow rate may be adjusted by the valve so that the flow rate flowing past the valve be substantially constant after $\dot{Q}_{Main}$ has surpassed threshold 40 (shown as solid line in FIG. 1b).

Figure 1C:
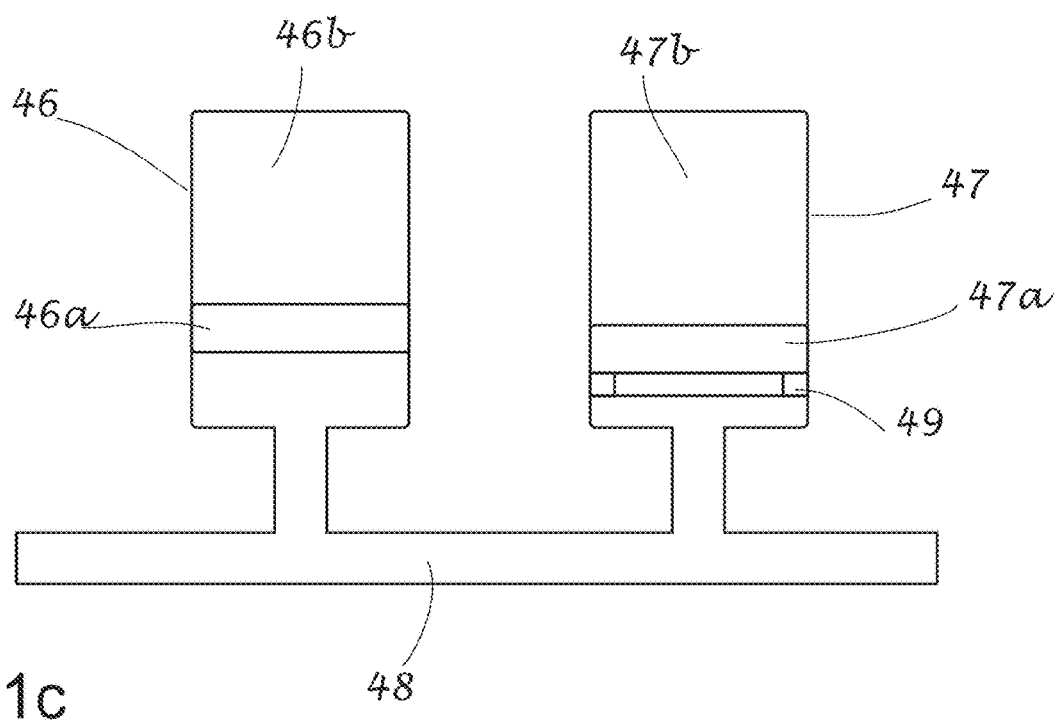
FIG. 1c illustrates an embodiment with multiple buffers pre-charged to different pressures for limiting the range of variation of the operational buffer stiffness.

FIG. 1c illustrates a dual buffer arrangement 45 with low pressure buffer 46 and high pressure buffer 47 which are in fluid communication with the hydraulic circuit by means of conduit 48. As the hydraulic pressure in conduit 48 increases, low pressure buffer piston 46a compresses buffer volume 46b while piston 47a remains seated against the stop 49 because of the elevated pre-charge pressure in volume 47b. When the pressure in conduit 48 surpasses the pre-charge pressure in volume 47b, buffer 47 is activated offering a reduced level of system stiffness at elevated pressures compared to buffer 46. The buffer volumes 46b and 47b may be filled with any convenient compressible material, such as for example, nitrogen. The pistons 46a and 47a (i.e. more compressible than the hydraulic fluid) may, for example, incorporate or be replaced by a flexible diaphragm. Alternatively or additionally, properly constrained seal bladders may be used to contain the compressible material in volumes 46b and/or 47b.

Figure 1D:
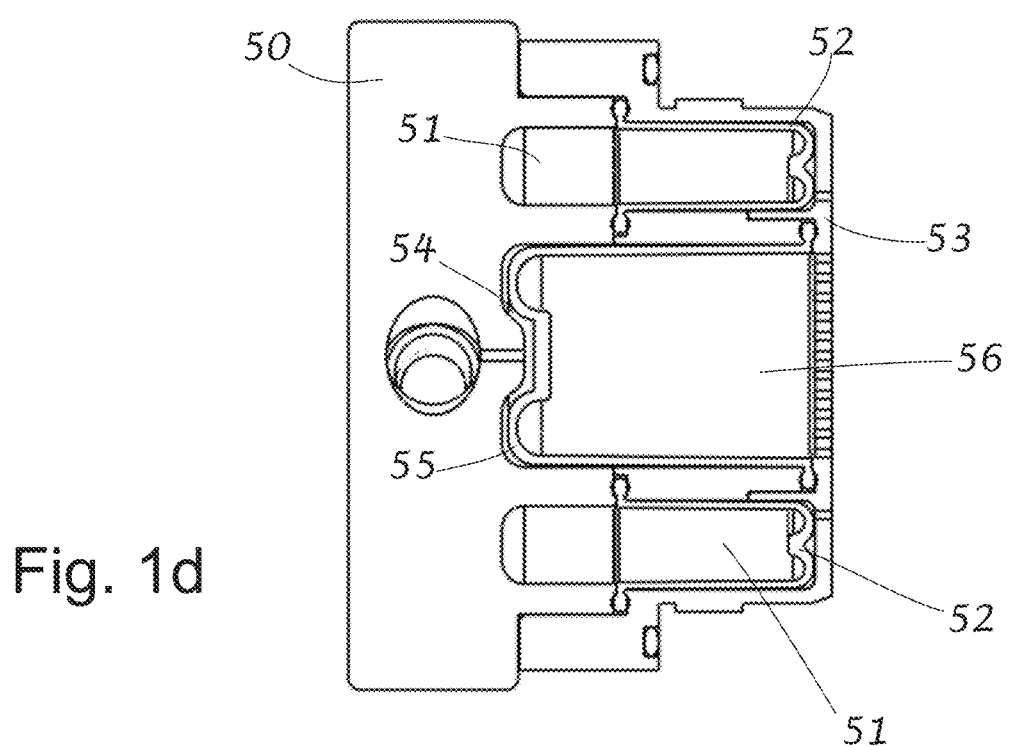
FIG. 1d illustrates an embodiment of multiple buffers in a single housing pre-charged to different pressures.

FIG. 1d shows a side sectioned view of a dual buffer in a single hybrid buffer housing 50. Annular high pressure buffer volume 51 is separated from the hydraulic fluid by flexible annular piston 52. The motion of piston 52 is constrained in one direction by perforated cover 53. Central low pressure buffer volume 54 is defined by the space between flexible piston 55 and housing 50. Volume 56 is filled with hydraulic fluid and in communication with the hydraulic circuit by means of perforations in plate 53.

Figure 1F:
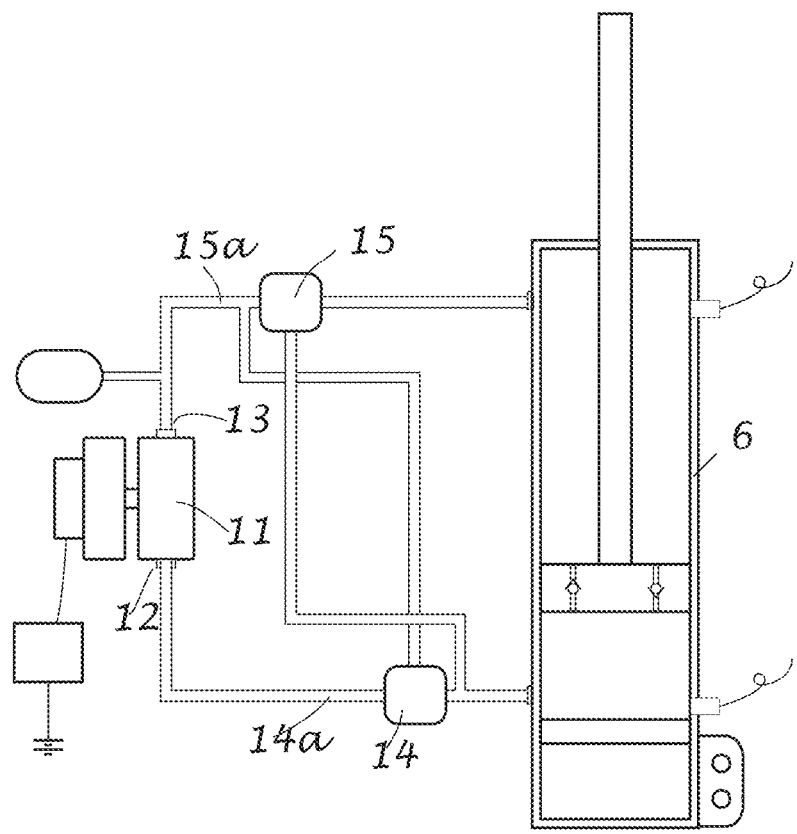
Figure 1G:
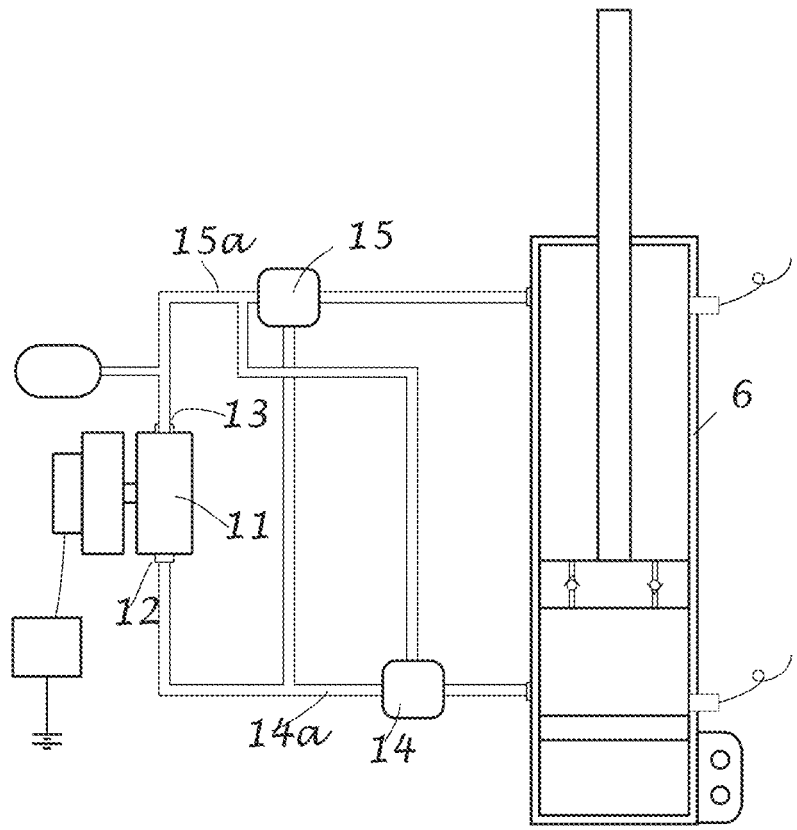

FIGS. 1f through 1h illustrate exemplary alternatives in the arrangement of conduits by which the bypass valves communicate with the hydraulic circuit. The bypass valves, and at least a portion of the conduits, may be incorporated into actuator housing 6.

Figure 2:
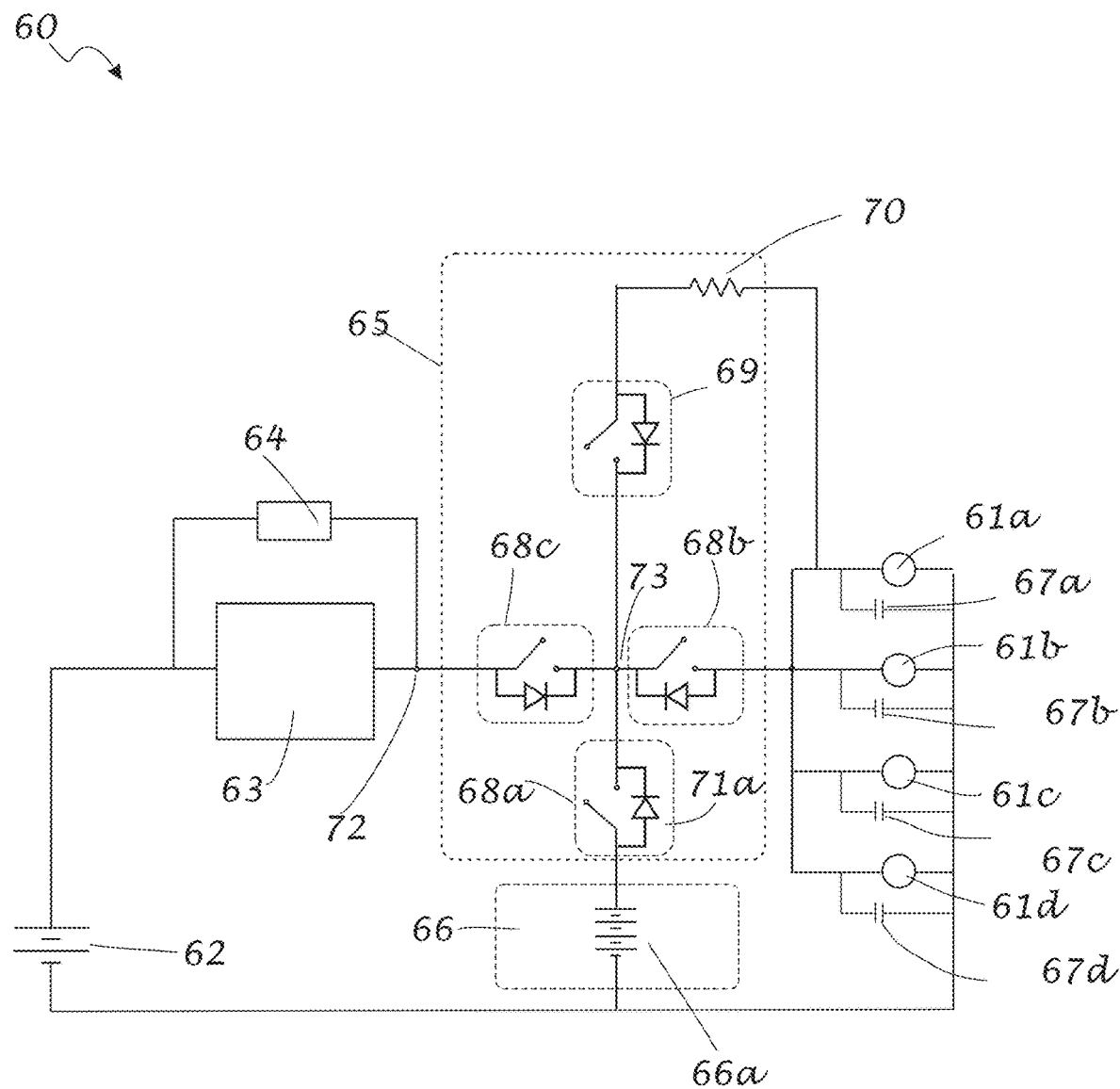
FIG. 2 is an illustration of electric power storage and supply for an active suspension system with low voltage, high voltage, and common ground.

FIG. 2 illustrates an exemplary electrical power distribution and storage system 60 for four active suspension corner controllers (CCs) 61a-61d configured for the active suspension system of an automobile. CCs 61a-61d drive individual actuators and/or collect energy generated by them. The main vehicle power storage may be, for example, a 12-volt battery 62. The battery voltage (typically 12 VDC) may be boosted to, for example, 48 VDC by DC-to-DC converter/controller 63. Parallel energy storage 64, such as for example, an ultra-capacitor (super-capacitor), may be included to accommodate high peak power requirements.

In some embodiments, a central vehicle controller (CVC) 65 is configured to provide electrical power to the CCs 61a-61d, various energy storage components, and electronics. The CVC 65 also protects the electronics and storage components from damage by, for example, preventing over-voltage, under-voltage, and/or overcurrent conditions. Additional power storage may be provided by a secondary energy storage system 66, which may include, for example, a 48 VDC battery 66a, a lithium-ion polymer battery, and battery management electronics including, for example, cell-balancing and coulomb counting electronics (not shown). Power conditioning capacitors 67a-67d are used to provide power conditioning to the four corner controllers 61a-61d, respectively.

CVC 65 may comprises power MOSFETs 68a-68c, additional MOSFET 69, (shown in open configuration) and pre-charge resistor 70. At start up, when capacitors 67a-67d may be discharged, exposing them to the full voltage of, for example, battery 66a, may cause excessive currents leading to damage to, for example, the corner controllers 61a-61d and the battery 66a and the power MOSFETs 68a-68b. The MOSFETs may be arranged in a manner where the associated body diodes are directed so as to preclude leakage flow path when the MOSFETS are open. At start up, MOSFET 69 is closed and the power conditioning capacitors 61a-61d are allowed to charge up through pre-charge resistor 70 and a closed power MOSFET 68a, and/or body diode 71a. After power conditioning capacitors 61a-61d are at least partially charged, MOSFETs 68b and 68c are closed and the system is allowed to operate normally. If, however, an anomalous condition is detected, for example, wherein excessive voltage is generated by one of the actuators and the associated corner controller, MOSFETS 68a-68c, and 69 may be opened to protect the components, such as for example, DC/DC converter 63 and battery 66a.

MOSFET 68c may be operated so that it is closed only when the voltage differential between nodes 72 and 73 is within an acceptable threshold. The threshold may be less than approximately 1V and more preferably the threshold is approximately 0V. Zero-voltage switching limits damage to electrical components due to power surging.

Additionally, the system may monitor the operational integrity of MOSFETs 68a-68c and 69. For example, it may check for current passing against the MOSFET's body diode when the MOSFET's switch is open. If the system detects current passing in this direction, the switch has likely shorted. Using this integrity evaluation method, the system may monitor various components for faults and indicate where and when they occur.

Figure 3:
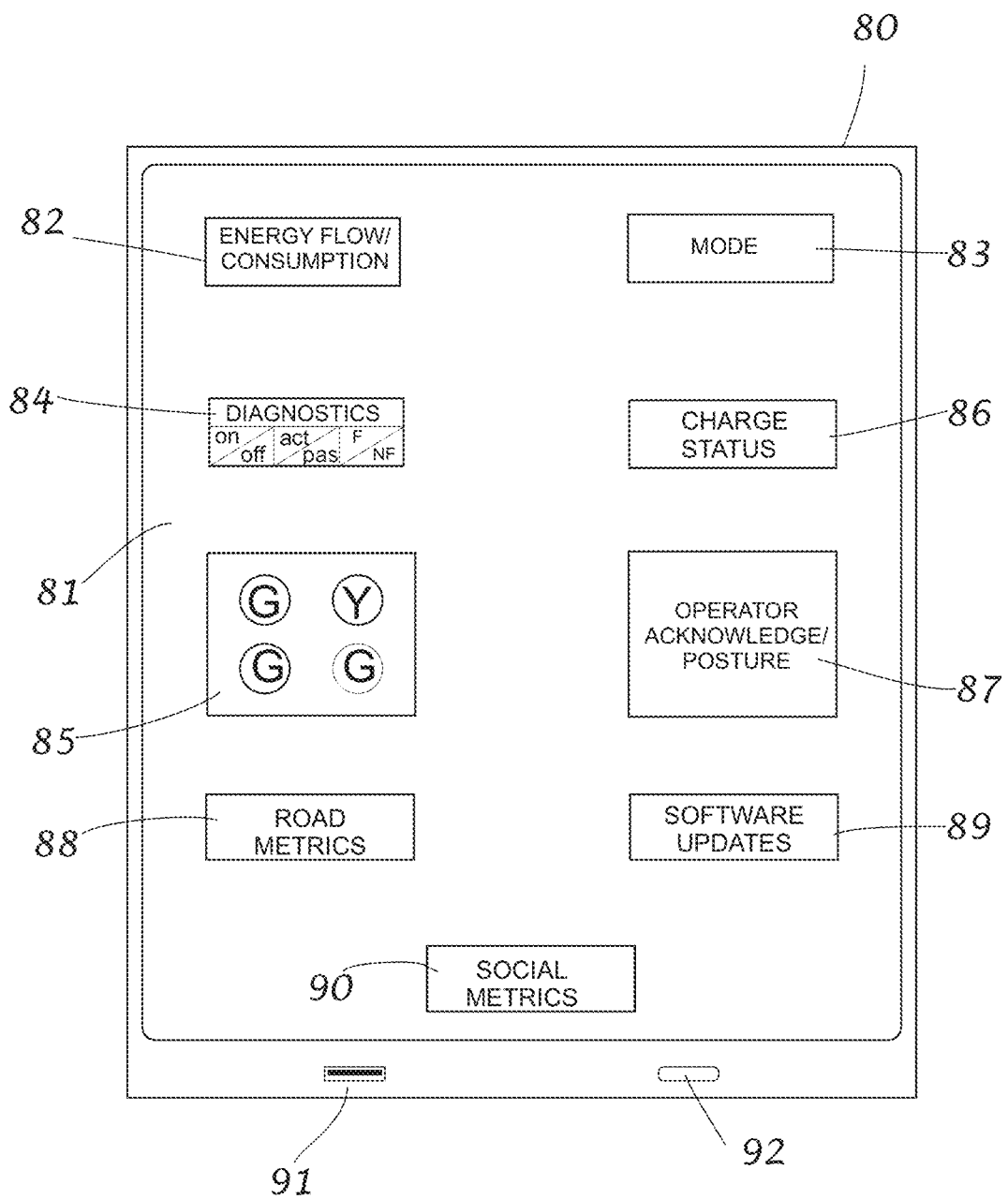
FIG. 3 is an illustration of an active suspension user/computer interface.

FIG. 3 illustrates an exemplary user/computer interface (UI) 80 for exchanging information with an active suspension system. The UI may comprise individual indicator lights or an integrated display screen 81 which may be touch sensitive with two-way communication capability. Indicators may convey information, for example, alphanumerically or by using indicator colors. An energy indicator 82 may be used to convey information about flow of energy between different components of the system. For example, the amount of energy being consumed and/or generated by one or more of the actuators may be displayed. The value being displayed may be an instantaneous value or represent an average over a selected time period. Mode indicator 83 may be used to specify the mode of operation of the system. It may also be configured as a touch sensitive mode selector button. Modes may be used to select, control, or limit various operating parameters such as, for example, power consumption and impact on fuel economy as well as vehicle handling, feel, and comfort.

Diagnostic indicators may be used to communicate whether the diagnostic system is on or off, in active or passive mode, or in a fault or no fault condition. In distributed active suspension system two or more wheels of a vehicle have substantially independent HMPs, GEMs and LECs. One or more LECs may communicate with other controllers.

Diagnostics for such systems may be based on data collected by the monitoring of the overall system, sub-systems such a suspension unit, or individual components such as, for example, the GEM 17, the HMP 11, LEC 18 or the actuator 2. Data may be collected, for diagnostic purposes, during a particular period such as, for example, an hour, a day, a week, a month, a year, since a particular event or occurrence such as an accident, breakdown or vehicle repair, or the life of the system. Average or instantaneous data collected during a certain time period may be compared to data collected over a different period. Alternatively or additionally the evolution of performance data may be monitored and evaluated. Instantaneous and/or average data may be compared to, for example, baseline manufacturer specifications.

Alternatively or additionally average and instantaneous data collected from one sub-system or component may be compared to one or more other sub-systems or components of a vehicle. For example, the performance data collected from suspension components associated with one wheel such as for example an HMP or a GEM, may be compared to the performance of corresponding components associated with one or more other wheels. For example, the instantaneous or average power consumption data from the suspension unit associated with a front wheel may be collected and compared to the instantaneous or average power consumption data of, for example, a rear wheel on the same side of the vehicle or the other front wheel.

Instantaneous and/or average data from a vehicle system, a subsystem or a component may be collected and compared to corresponding data from other vehicles that are, for example, operating on the same or similar roads (as determined from, for example, GPS data), in a particular (or local) area, a particular region, of a particular vehicle model or manufacture, with a certain use profile, serviced by a certain repair facility or repaired by a certain individual. This information may be exchanged directly between vehicles or between a vehicle and one or more central data collection facilities using one or more convenient communication technologies, such as wireless or the Internet. The information may be exchanged on an ongoing basis or uploaded in a batch basis at a convenient time during vehicle operation, when the vehicle is not being used, or is being serviced.

The diagnostics may be active or passive. The passive diagnostics may, for example, comprise monitoring data from or related to the overall system or one or more subsystems or components or sensors. Data may include information such as, for example, power consumption and/or power production by one or more of the actuators or the output from various sensors such as, for example, accelerometers, pressure sensors, strain gauges, proximity sensors, and range detectors. In addition to instantaneous or average values of one or more parameters, other statistical quantities such as, for example, maxima, minima, or standard deviation of various parameters may be monitored or compared. These quantities may include, for example, actuator force, actuator velocity, power produced, power consumed, hydraulic pressure, fluid temperature, fluid dielectric constant, GEM temperature of various batteries and power components.

Determination of the existence of a fault, and the severity of such a fault, may be based on instantaneous data or data averaged over time. For example, a fault determination may be at least partially based on the existence of changes in the performance of a particular actuator, for example, its electronics, HMP, GEM and associated sensors over a particular time period. Alternatively or additionally, a fault determination may be based on differences in the performance of two or more actuators either instantaneously or averaged over time. For example, extraordinary difference in power consumption or generation among two or more actuators in a vehicle may be used as a fault indicator. This difference may be based on average values determined over a sufficiently long period of operation so that the effect of road-induced anomalies are minimized. For example, if during normal operation one actuator is consistently consuming 20 percent, or other predetermined threshold value, more average power over a predetermined period than the other actuators, a fault status may be declared. Alternatively if one actuator is producing 50 percent, or other predetermined threshold value, less power than the other actuators over a predetermined period, a fault status may be declared.

An alternative diagnostic may be based on changes to the amount of power being produced or consumed by the same actuator over a period. For example, if a given actuator is found to have an increase of 10 percent, or other predetermined threshold value, net power consumption each month while the consumption by other actuators is constant a fault may be declared. Alternatively, if there is a significant and precipitous change in the power production of a given actuator after an event, such as a repair procedure or accident, a fault may be declared.

The active suspension system may also be used in an active diagnostic mode where one or more actuators are used to induce a certain motion or excitation in the vehicle. The system may then use available output from various sensors and measurements to determine if the performance is within acceptable limits. These limits may be predefined by, for example, a manufacturer, the vehicle owner or operator by using the UI, or established by the performance of the particular actuator or other actuators over a particular period of time. This process may be performed, with or without vehicle operator intervention, while the vehicle is being driven on the road or when it is stopped, for example, at a repair facility. The diagnostics indicator 84 may be configured as a touch sensitive button to allow the vehicle operator to initiate an active or passive diagnostic mode and/or set various diagnostic parameters. Fault indicator 85 may be used to indicate actuator-specific operational status by, for example, using a color or alphanumeric code.

A charge status indicator 86 may be used to show the level of charge in one or more energy storage devices. This information would allow the vehicle operator to make selections that will, for example, assist in conserving energy by selecting operating modes that are less energy intensive.

The posture indicator 87 may be used to select the manner in which a vehicle greets or responds to a vehicle operator. For example, an operator may use the posture indicator 87 to program the active suspension system to make a sequence of certain movements in response to the presence of, for example, a certain operator. For example, when an operator uses a keyless entry system that identifies that operator, the active suspension system may perform a series of greeting moves, such as for example, a bow or a rocking motion. In addition, these gestures may be programmed to occur when the operator locks and/or unlocks the vehicle. This system response may be dependent on other parameters such as, for example, the active suspension system may react differently depending on the time of day, or if the encounter is the first one of the day. The desired responses may be preselected, by using the UI, by the operator and/or owner for one or more individuals that may have access to the vehicle.

A road metrics indicator 88 may be used to convey the quality of the road being travelled. Road metrics may include, for example, frequency of potholes, depth of potholes, flatness of the road surface, the lateral slope and longitudinal slope. With an active suspension system, a driver may be unaware of the quality of the road and the road metrics indicator may help the operator tailor the vehicle speed to the road condition and avoid unsafe conditions. Road metrics information may also be shared with other vehicles and parties. For example, the indicator may be used to rate the quality of the road being travelled by the vehicle relative to, for example, other vehicles in a given locality or broader region or against an absolute metric. Information gathered in this manner may be exported to other interested parties such as, for example, municipal officials responsible for road repair and maintenance.

A software interface indicator 89 may be used to inform an operator that various software updates may be available. This indicator may also be configured as a touch sensitive button so that the operator may utilize it to initiate a download at a desired time. Downloads may occur via various communication networks.

A social metrics indicator 90 may be used to indicate the efficiency benefit that is gained from the power generating capacity of the suspension system. For example, the system may compute and display the fraction of the energy used by the active suspension system that is provided by means of regeneration.

A computer interface may be provided to the active suspension system by means of, for example, a USB port 91, or infrared port 92, or the vehicles OBD II system (not shown). A computer interface may be used to collect performance and diagnostic data from the system and also provide more in depth user communication with the system than is offered by indicators 82-90.

A computer interface may also be used to collect and record positional data from the actuators during various modes of operation. These modes may include, for example, fully active suspension system operation and/or passive system operation. The computer interface may also be used to collect such positional data with the vehicle operating as a passive suspension system. The positional data may be collected as the vehicle is travelling over various road surfaces. The recorded data may then be replayed for demonstration purposes in, for example, a vehicle show room, so that potential customers may be able to observe or experience the benefits that they would gain by purchasing a vehicle with the active suspension system. Alternatively or additionally, the relative benefits of a particular active suspension system may be demonstrated by using this playback feature.

A gerotor-based HMP may be used in a variety of hydraulic actuation systems, such as for example, active suspension systems, that require rapid response but need to be manufactured at a relatively low cost.

Figure 4:
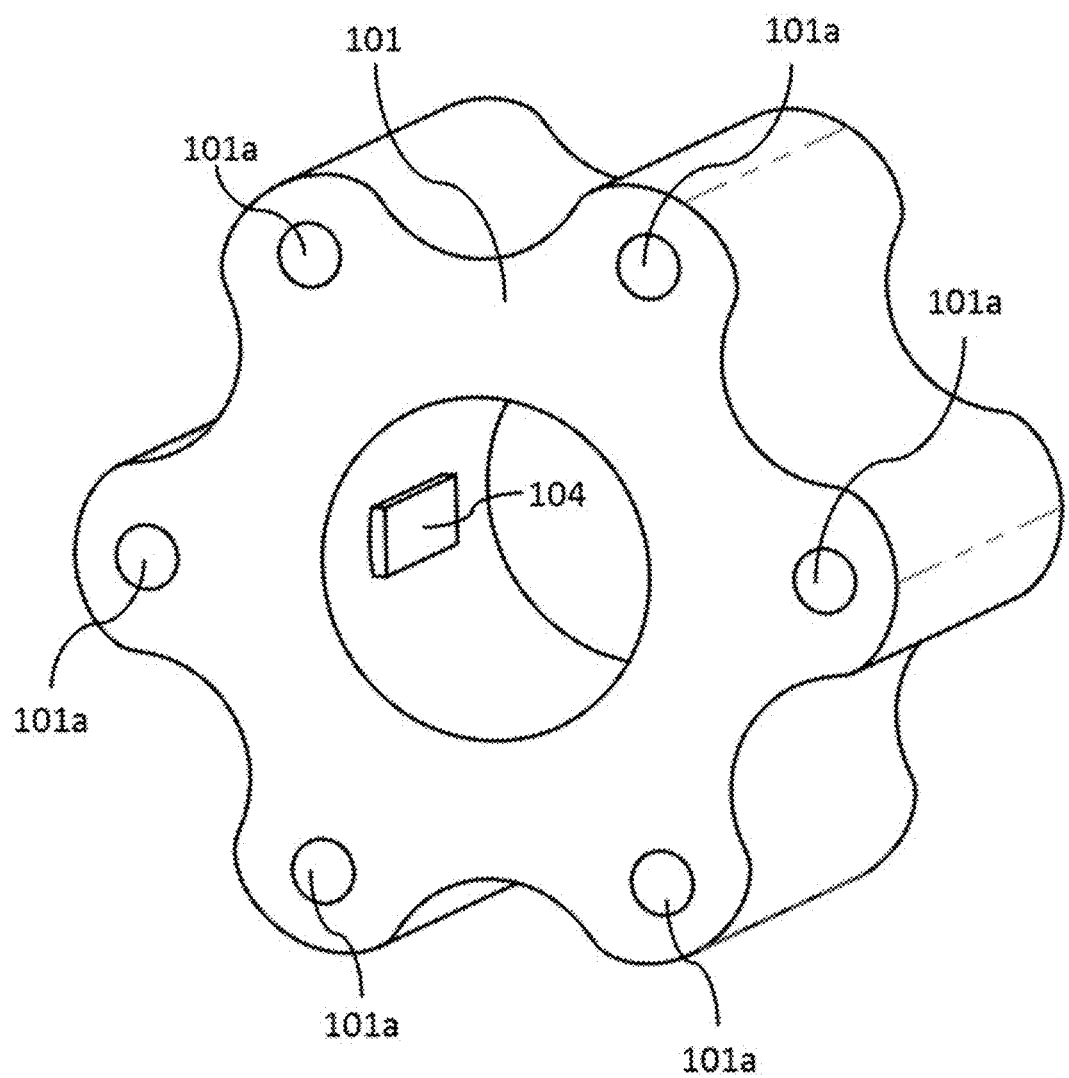
FIG. 4 shows a perspective view of an inner rotor of a gerotor unit.

FIG. 4 illustrates inner rotor 101 with six lobes and six holes 101a. The holes may serve several functions including, for example, reducing angular inertia and maintaining more uniform wall thickness. Uniform wall thickness facilitates flow of material and reduces stress during cooling in a mold if the rotor is manufactured by injection molding. Key 105 may be used to couple the inner rotor 101 to the shaft (not shown). The key 104 may be molded as a part of the rotor (if manufactured by injection molding), physically attached to the rotor by, for example, an adhesive. Alternatively, a conventional key may be used that is coupled to the rotor with an appropriately sized conventional keyway.

Figure 5A:
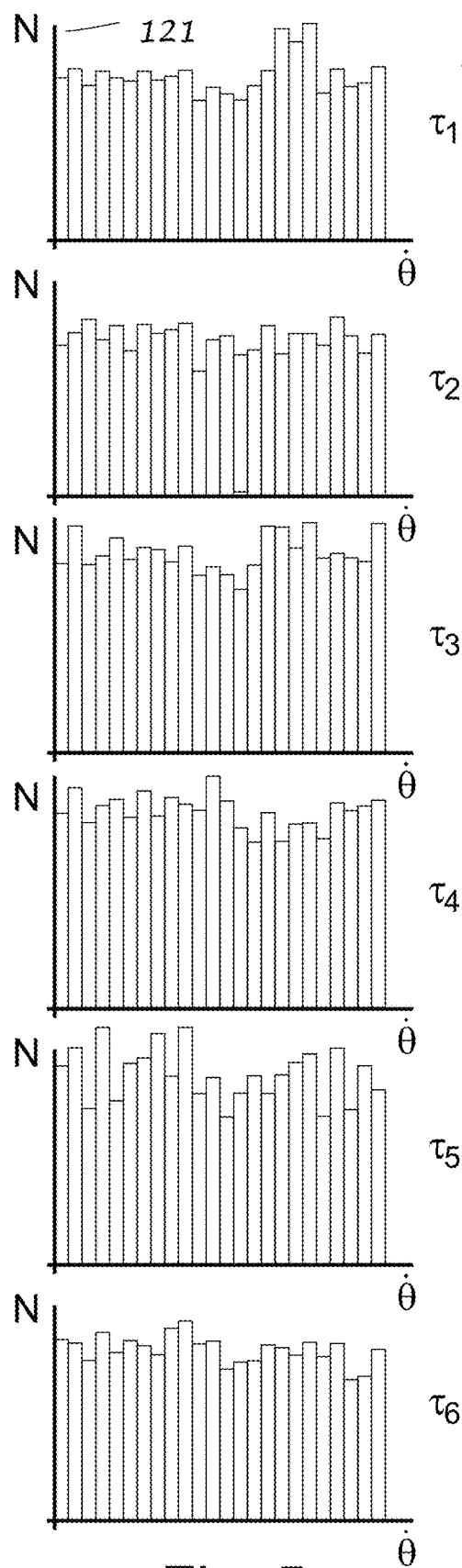
FIG. 5a shows a series of 6 histograms, each representing how frequently the HMP operates at various speeds for a given torque over a given time period.
Figure 5B:
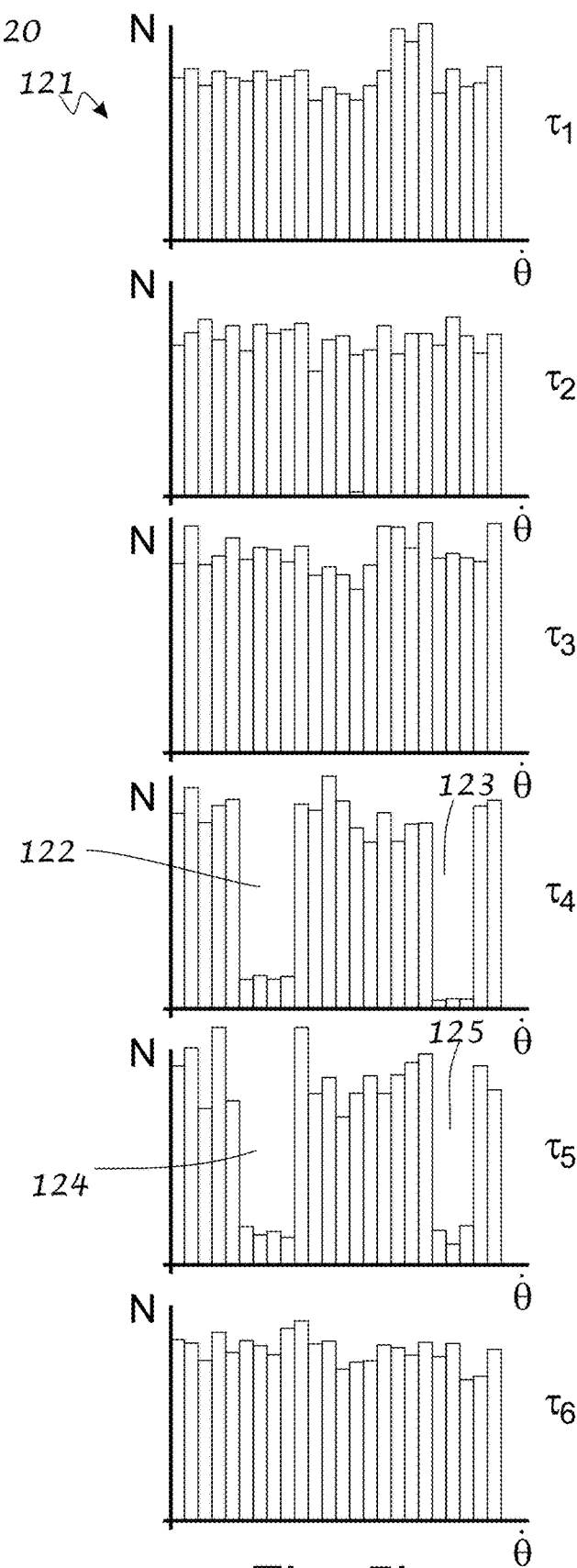
FIG. 5b shows the histograms of FIG. 5a where the use of speeds in certain ranges, at two different torques, are attenuated.

FIG. 5*a* shows a series of angular speed histograms 120 of an HMP for torques $\tau_1$ through $\tau_6$. Each vertical bar represents the frequency (N) 121 of occurrence of a given angular speed $\dot{\theta}$ for a given torque $\tau_1$ through $\tau_6$. FIG. 5*b* shows the histograms of FIG. 5*a* where frequency attenuation has been implemented to suppress the occurrence of certain torque and angular speed combinations, for example because, those combinations excite resonance frequencies in a vehicle. FIG. 5*b* shows that all HMP speeds are available for torques $\tau_1$ through $\tau_3$ and $\tau_6$. But the use of torque $\tau_4$ the in angular speed bands 122 and 123, as well as use of torque $\tau_4$ for bands 124 and 125 is suppressed. It should be noted that the use of the combination of $\tau_4$ and $\tau_5$ in bands 122-124 is not necessarily eliminated. Such combinations may still occur but at a substantially reduced rate. The degree to which torques in various speed bands are suppressed may be pre-programmed by the manufacturer or be selected, for example, by the vehicle operator by using the user interface.

In another embodiment, a frequency attenuation algorithm may automatically adjust torque, which is within an unacceptable range, to bring the system into a less noisy state. These contours between good and unacceptable can be seen in FIG. 5*c*.

Figure 5C:
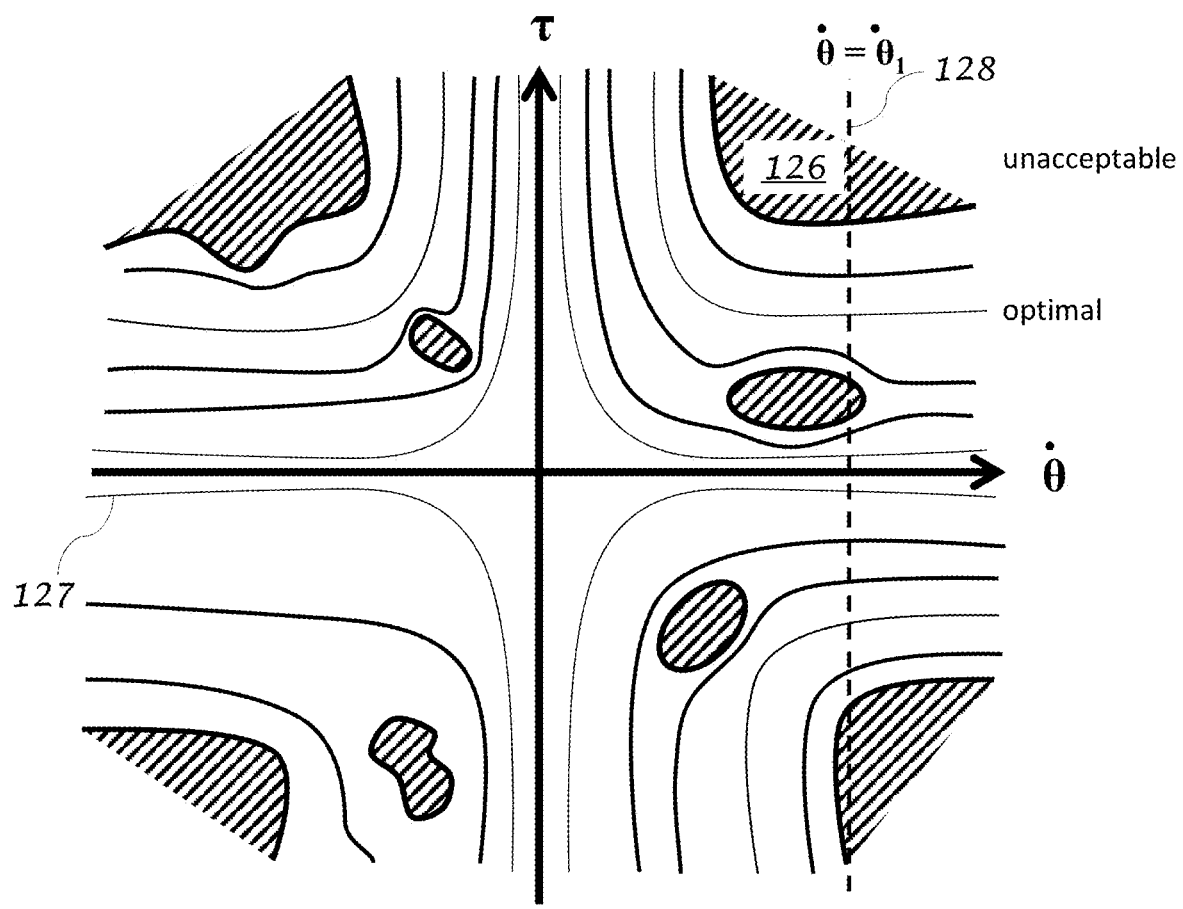
FIG. 5c is a contour map of torque vs. angular velocity showing particular areas that cause resonances to occur in the vehicle.

FIG. 5*c* illustrates the torques/velocity domain of, for example, a corner actuator of an active suspension system. The angular velocity ($\dot{\theta}$) is typically an input to the system and is largely determined by the motion of the wheel as the actuator's linear motion is translated to rotational motion of the HMP. The control system may request the HMP to produce a certain torque ($\tau$) based on various operating parameters and/or requirements. The shaded regions in FIG. 5*c*, for example region 126, are regions where the particular torque/angular velocity combination results in undesirable resonance in a vehicle. These undesirable regions may be determined empirically by testing the vehicle at various torque/angular velocity combinations. Therefore, the frequency attenuation algorithm restricts the control system from accessing torque/angular velocity combinations within these shaded regions. The contour lines surrounding these unacceptable regions show a gradient from "unacceptable", the shaded regions such as region 126, to "optimal" such as thin line 127, where the noise and/or vibrations are low. Regions outside "unacceptable" regions represent "acceptable" torque/angular velocity combinations where objectionable conditions, such as for example, excessive noise generation is limited.

This map is typically substantially static (i.e. specific to the vehicle) and therefore does not vary with time. However, at any particular time, if necessary, an active suspension actuator may operate anywhere in the angular velocity/torque domain. At time $t=t_1$, the system may have an angular velocity $\dot{\theta}=\dot{\theta}_1$, which has three regions where torque/speed combinations are unacceptable due to, for example, excessive noise cancellation. The frequency attenuation algorithm would typically avoid these three unacceptable regions in FIG. 5*c*. It is desirable that the torque be set to values as near to where the particular value for $\dot{\theta}$, as indicated by dashed line 128, intersects the "optimal" lines as possible and/or as far away from the unacceptable regions.

Figure 5D:
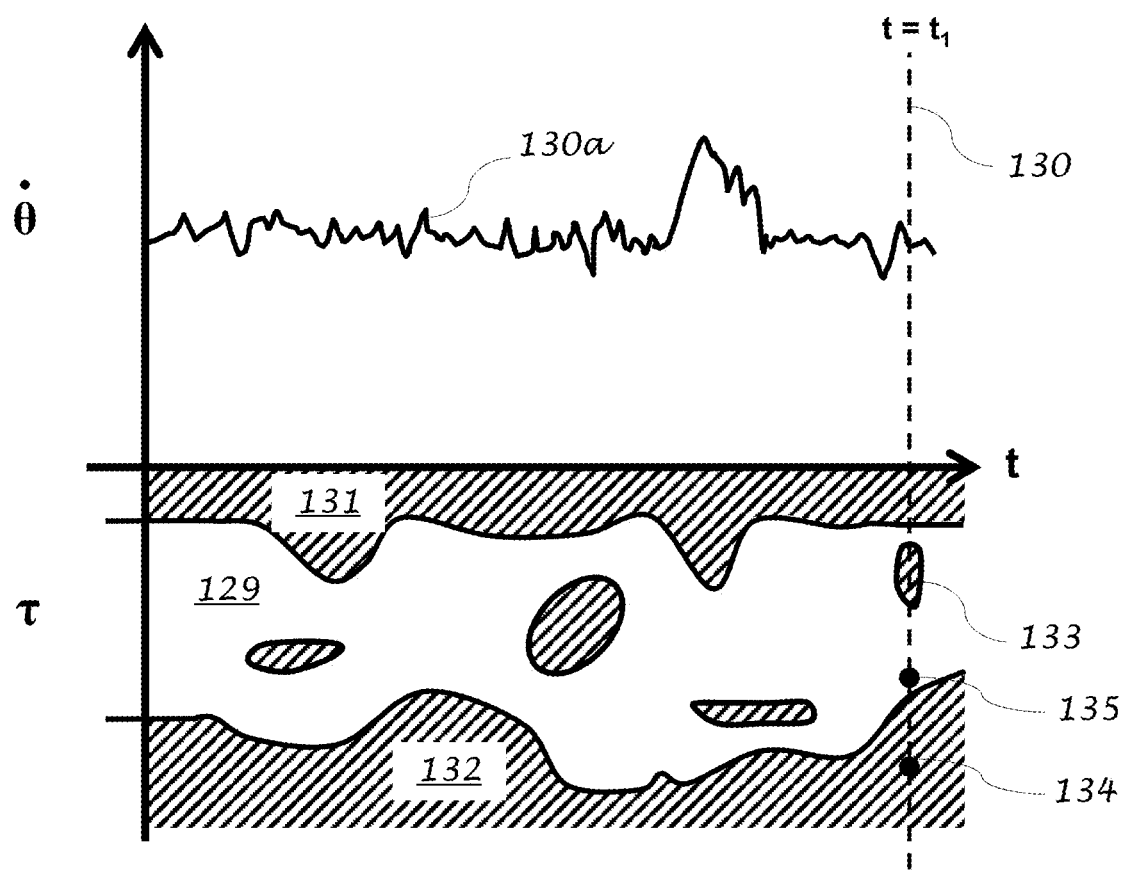
FIG. 5d is a plot of torque and angular velocity vs. time, which depicts a slice of the contour map shown in FIG. 5c at each value for time showing the acceptable torque range for the corresponding angular frequency.

FIG. 5*d* displays a plot of the variation of angular velocity ($\dot{\theta}$) 130*a* as a function of time. The range of available torque/angular velocity combinations at a given time $\tau_1$ is defined by the intersection of a vertical line 128 in FIG. 5*c* with regions of acceptable and unacceptable torque/angular speed. This vertical line is located at a value of $\dot{\theta}_1$ corresponding to time $t_1$.

FIG. 5*d* illustrates that for each angular velocity of the hydraulic motor/pump, there is an acceptable range of corresponding torques. The acceptable torque region is shown as region 129. As time progresses, the electronic controller may the HMP torque within the region 129 to avoid exciting resonance frequencies in a component of the vehicle. This torque range is not constant. At a particular value for angular velocity ($\dot{\theta}$), there may be both a ceiling 131 and a floor 132 for the acceptable torque and any value between the ceiling and the floor will adequately avoid frequencies, which induce resonance. For other angular velocity values, there may be torque regions between the floor 132 and the ceiling 131 that are also unacceptable to apply to the HMP. For example, at a particular time, $t=t_1$, as shown by vertical line 130, with a particular angular velocity, there is a torque region 133 between the floor 132 and the ceiling 131 that may be avoided by the controller so as to limit resonance in the vehicle body.

According to one embodiment, for example, at time $t=t_1$, as shown by vertical line 130, the torque controller may request the system to execute a torque with the value at point 134. However, as identified by the frequency attenuation system, implementing that torque may excite system resonances or highlight other undesirable system characteristics, such as for example, peaks in the attachment point transmissibility, or acoustic resonances of the structure. The point 134 is located in region 132, which the frequency attenuation system has identified as unacceptable. Therefore, the frequency attenuation system limits the torque that the system may apply so that the torque falls within the acceptable range shown as 129, for example, at point 135. It should be noted that for certain frequencies there may be no values of torque that are problematic. This is an example of the system's ability to use smart limits.

Figure 6A:
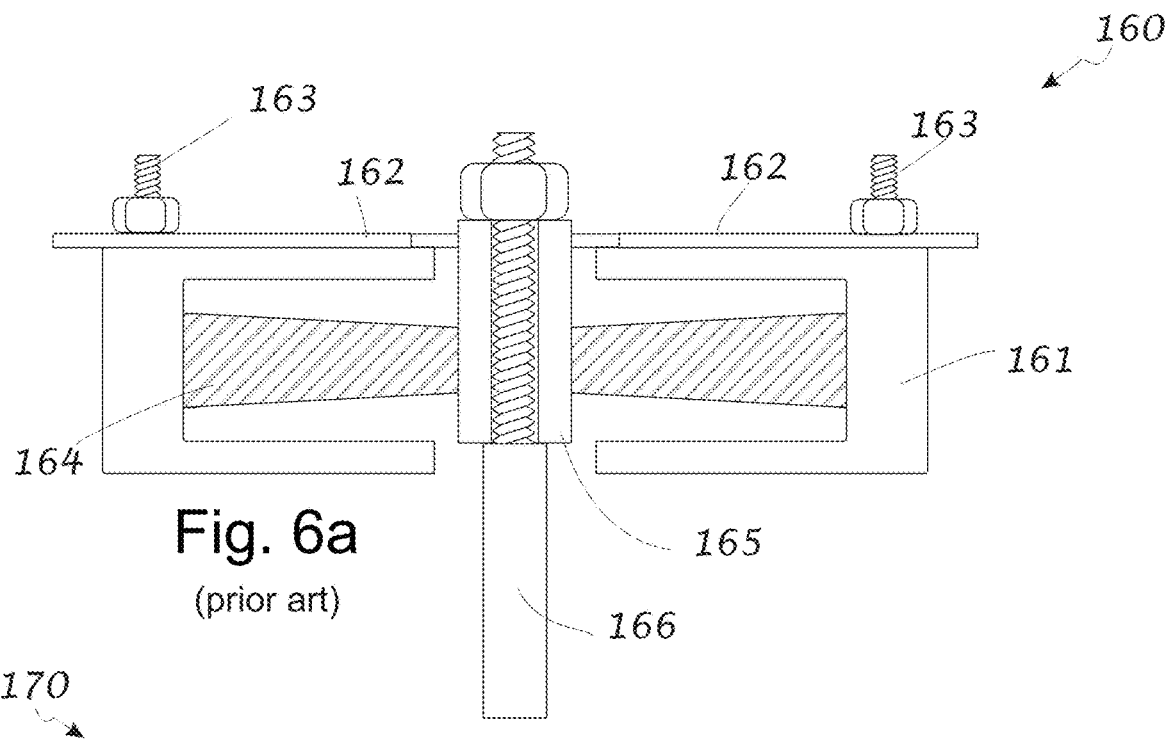
FIG. 6a illustrates a conventional top mount of a shock absorber.

FIG. 6*a* illustrates a conventional top-mount assembly 160 of a shock absorber. The top-mount bracket 161 is fastened to vehicle body component 162 using studs 163. Isolator 164 (a damping/spring device) is firmly attached to top-mount bracket 161 and inner sleeve 165. Shock absorber piston rod 166 is fastened to inner sleeve 165.

Figure 6B:
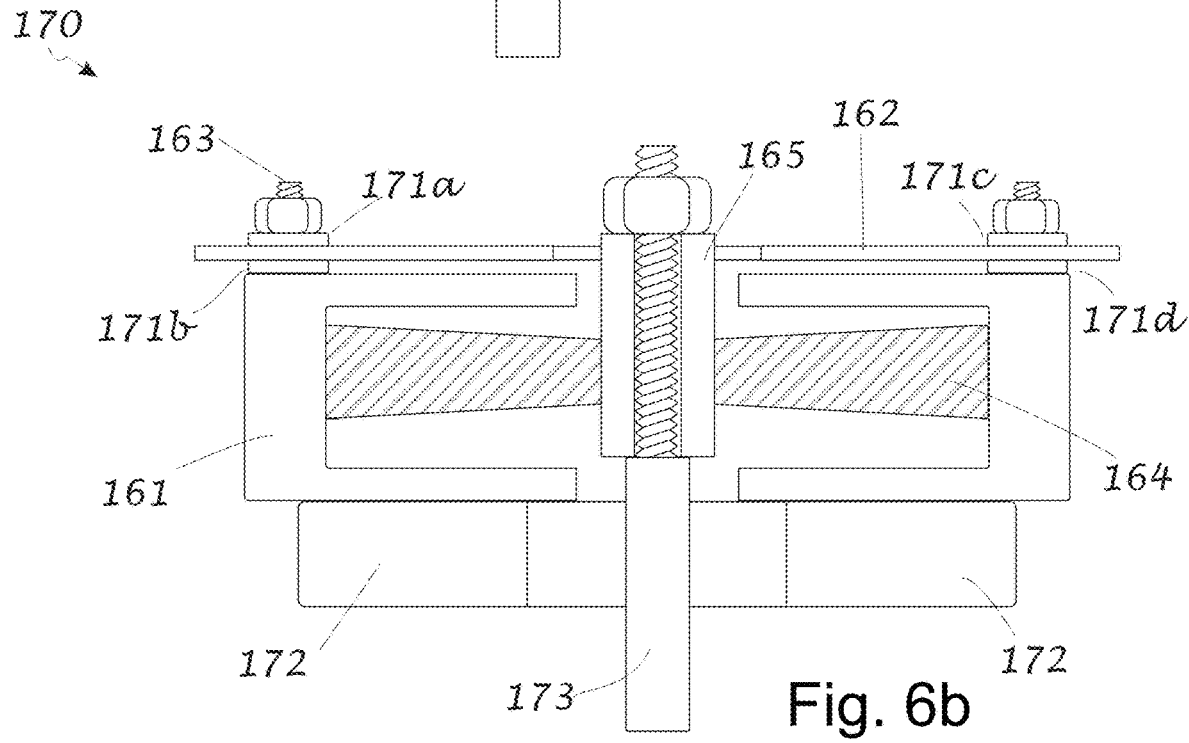
FIG. 6b illustrates a modified top mount of an active suspension system modified to incorporate a tuned mass damper.

FIG. 6*b* illustrates an improved top-mount 170, which incorporates tuned mass damping. In embodiments using tuned mass damping, vehicle body component 162 is sandwiched between two pairs of damping/spring devices 171*a* and 171*b*, and 171*c* and 171*d* that may be manufactured from materials, such as for example, rubber, plastic, and fibrous material. Damping/spring devices 171*a*-171*d* may be formed in the shape of washers. The damping/spring devices exhibit both a desired damping coefficient and a spring constant. Additional mass 172 may be attached or otherwise integrated with top-mount bracket 161. The mass of components 161, 172 and actuator rod 173 and damping/spring devices 171*a*-171*d* constitute a tuned mass damper. By properly selecting the masses and the damping coefficients and spring constants of damping/spring devices, vibrations at selected frequencies may be attenuated. It should be noted that depending on the frequency range that needs to be attenuated, the mass of the bracket 161 may need to be reduced. The disclosure is not limited to top mounts with a particular mass or top mounts that are lighter, heavier or the same weight as a conventional top mount bracket.

Figure 7A:
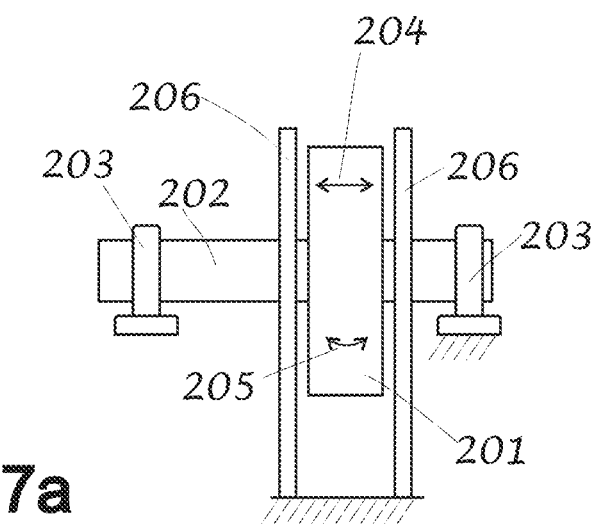
FIG. 7a shows an embodiment of a hydraulic motor/pump and shaft illustrating the planes or directions in which the hydraulic motor pump is able to dynamically self-adjust.

FIG. 7*a* illustrates an embodiment of an element of an HMP attached to a drive shaft and depicts the planes or directions in which the hydraulic motor pump element is constrained and the planes or directions in which it is floating and can self-adjust. The hydraulic motor/pump element 201, which in this embodiment is the inner rotor of a gerotor, torsionally engages shaft 202 by means of a torque-transferring element (not shown). In this embodiment, the shaft 202 is supported by bearings 203. In other embodiments, the shaft may be cantilevered, i.e. supported only at one end. Element 201 effectively transfers radial loads to/from the shaft and remains engaged with the torque-transferring element during operation.

Shaft 202 is a circular cylinder with an outer diameter that is smaller than the diameter of the opening in element 201 in which it is received, i.e. with a with a clearance fit. In embodiments the difference in the diameters may be sufficiently large to allow the element 201 to twist or to slide along shaft 202 but small enough to not inhibit or interfere with the transfer of torque to and from the HMP.

As shown in FIG. 7a, the HMP element 201 may dynamically self-adjust be being free to move in the axial direction 204 and/or the twisting direction 205. During operation of the HMP, element 201 may self-adjust to better orient itself relative to the housing element 206, reducing, for example, drag and noise. In embodiments, the HMP element settles into a position parallel to both elements 206 and with equal spacing between it and each of them. The HMP element 201 may dynamically adjust to seek an optimal position depending on operating parameters of the overall system, including but not limited to operating pressure, the rotational direction, speed, and/or acceleration.

Figure 7B:
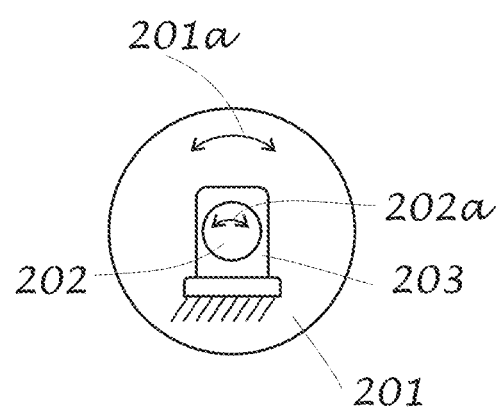
FIG. 7b shows the embodiment of a hydraulic motor/pump and shaft of FIG. 8a wherein shaft/rotor interface is torsionally stiff.

FIG. 7b illustrates an end view of the of the shaft assembly in FIG. 7a. In embodiments there is no significant difference between the angular displacement 201a of element 201 and displacement 202a of shaft 202 of the HMP.

Figure 8A:
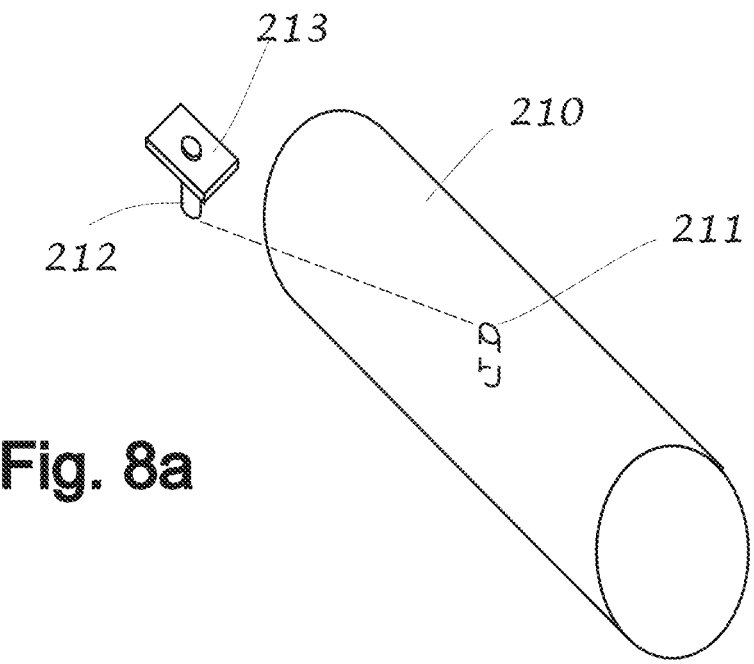
FIG. 8a illustrates a shaft with an articulating key (pin-block assembly) as a torque-transferring element.

FIG. 8a illustrates a shaft 210 with radial opening 211. In this embodiment, opening 211 is cylindrical and receives pin 212. In this embodiment, the fit between pin 212 and opening 211 is a line-to-line fit. In other embodiments, the fit may be a transition fit or an interference fit. The length of pin 212 is selected such that when pin 212 is operationally engaged in opening 211 a portion of the pin remains protruding from the shaft. At least a portion of the protruding length of pin 212 may be used to engage an HMP element (such as element 201 in FIG. 7a). An intervening block 213 may be used to distribute the stresses in the rotor over a larger area. Intervening block 213 and pin 212 together establish an articulating key or pin-block assembly. Block 213 permits the bearing surface in the element that is engaged (such as element 201 in FIG. 8a) to be expanded so that the contact stresses in the element can be distributed over a larger area and reduced. This arrangement allows greater torques to be transferred between the shaft and elements made of softer materials, such as plastics. With the use of an articulating key, the clearance between the block and the key way slot may be minimized since it only needs to accommodate linear motion in the axial direction. Motion in the twisting direction may be accommodated by, for example, relative motion between the block 213 and pin 212.

Figure 8B:
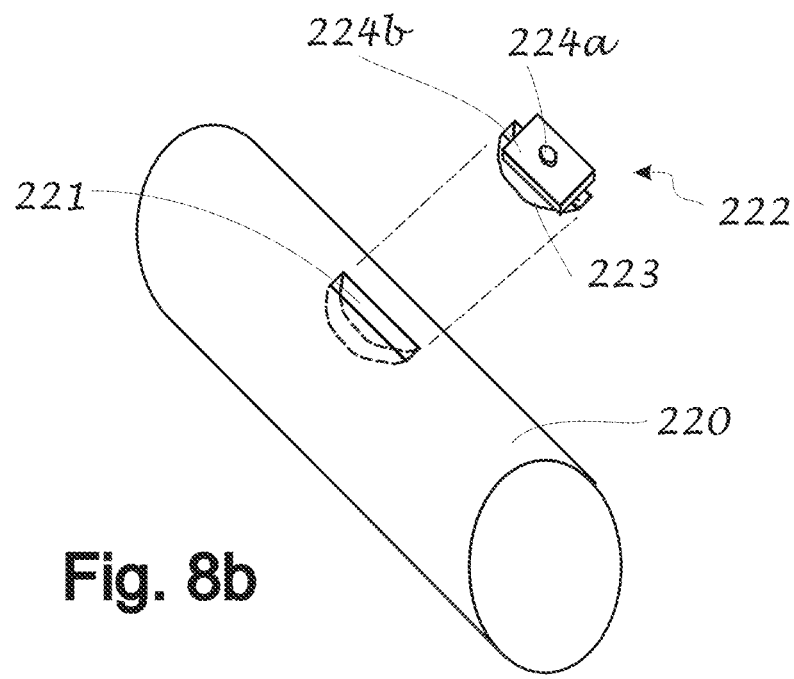
FIG. 8b illustrates a shaft with a modified Woodruff key torque-transferring element.

FIG. 8b illustrates a shaft 220 with opening 221 configured to receive a conventional Woodruff key (not shown) or modified Woodruff key 222. In this embodiment, the fit between portion of the Woodruff key 223 received in opening 221 is a line-to-line fit. In other embodiments, the fit may be a transition fit or an interference fit. Alternatively or additionally, the modified Woodruff key 222 may be welded into opening 221 by, such as for example, electron beam welding. When modified Woodruff key 222 is operationally engaged in opening 221, a portion of the key remains protruding from the shaft 220. This protruding portion may be used to, for example, engage an element of an HMP, such as the inner rotor of a gerotor, in order to transfer torque between the two components. Any conveniently shaped key may be used instead of a Woodruff key.

Modified Woodruff key 222 combines the advantages of a Woodruff key, such as increased load bearing area in the shaft, and the advantages of the articulating key shown in FIG. 8a. The modified Woodruff key 222 comprises a lower portion 223 with pin 224a. Pin 224a is received in block 224b, which is used to engage an element of an HMP, such as the inner rotor of a gerotor.

Figure 9D:
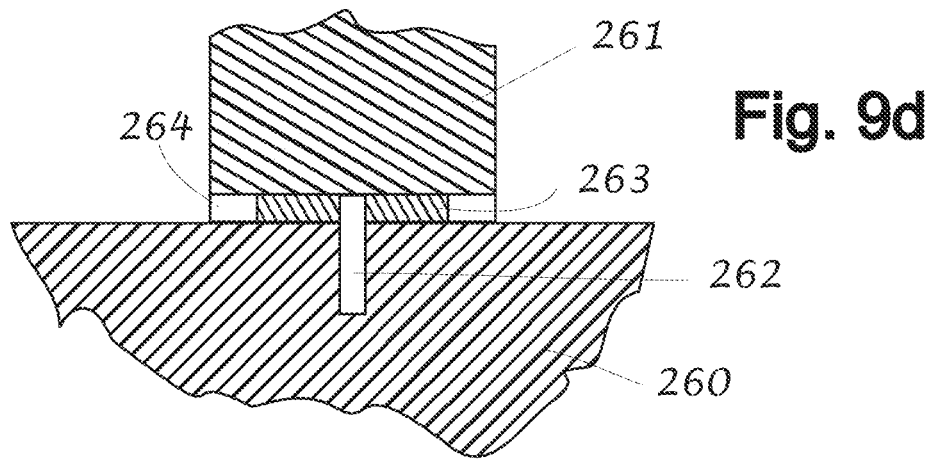
FIG. 9d illustrates a partially sectioned view of a shaft/rotor interface with an articulating pin-block assembly torque-transferring element.
Figure 9E:
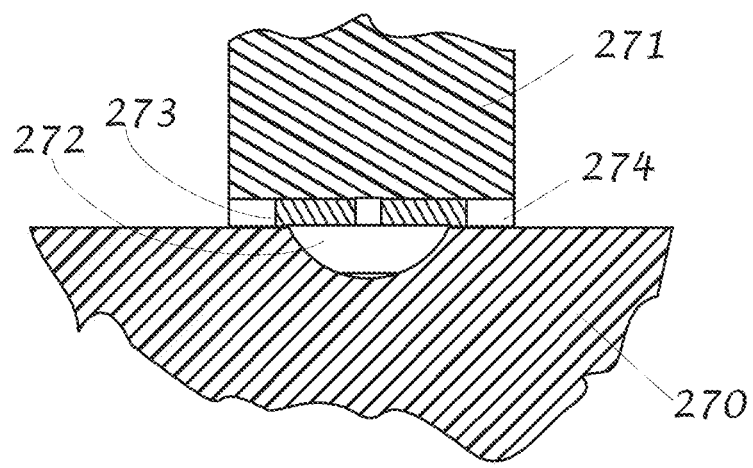
FIG. 9e illustrates a sectioned view of a shaft/rotor interface with a hybrid Woodruff pin-block assembly torque-transferring element.
Figure 9A:
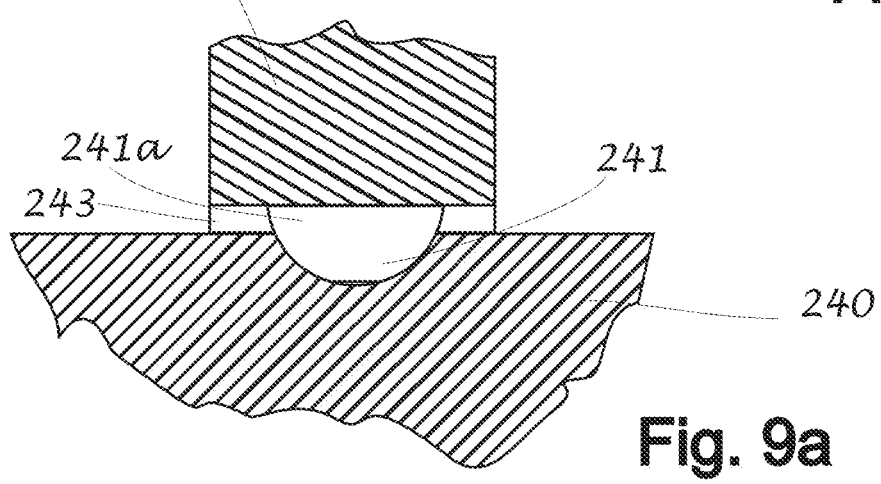
FIG. 9a illustrates a sectioned view of a shaft/rotor interface with a Woodruff key torque-transferring element.

FIG. 9a illustrates the interface between a shaft and an HMP element, such as for example the inner rotor of a gerotor, where the torque-transferring element is a Woodruff key. Shaft 240 (shown in section) receives a portion of Woodruff key 241. The upper portion 241a of Woodruff key 241 is also received in a slot in HMP element 242. The dimensions of the key may be determined, for example, based on the torque that needs to be transferred, cyclic loading, the bearing surface in the shaft, the bearing surface in element 242, and the material properties of the shaft 240, the key 241, and the element 242. In the embodiment in FIG. 9a the key is held firmly in the shaft the width of slot 243 that receives the protruding portion 241a of key 241 be oversized so that element has limited latitude to twist about an axis parallel to a radius of the shaft. The amount by which the slot width needs to be oversized must be increased to achieve the same degree of twist with longer keys.

Figure 9B:
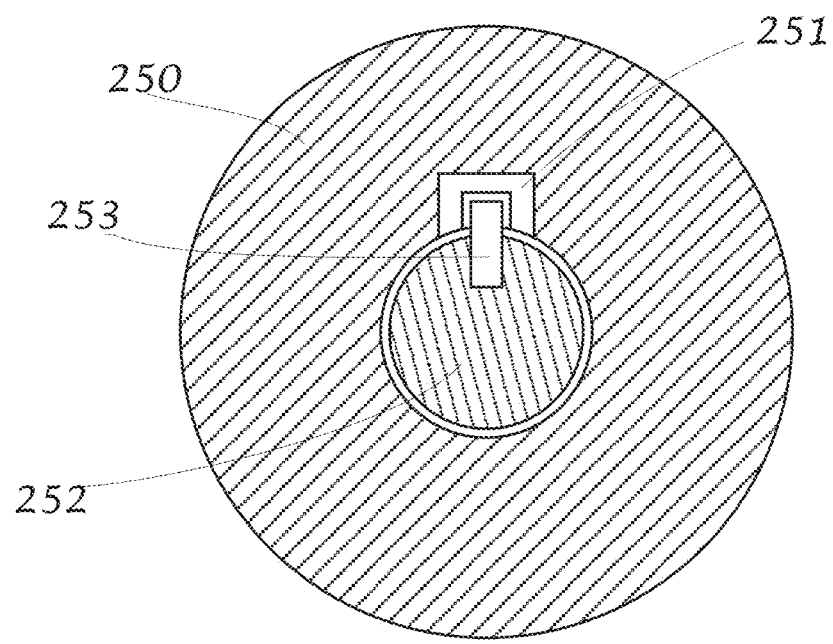
FIG. 9b illustrates a partially sectioned view of a shaft/rotor interface with a torque-transferring element engaged in a rotor insert.

However, the use of an oversized slot width results in torsional lash, which may result in high impact forces when the key collides with the sides of the slot. The effect of these collisions may be mitigated by reinforcing the slot walls using inserts. For example, as shown in FIG. 9b, if the HMP element 250, connected to shaft 252 by torque-transferring element 253, is made of a softer material such as plastic, metallic insert 251 may be used to reinforce the slot that receives element 253. The reinforcing insert may be incorporated in the rotor by using, for example an over molding process.

Alternatively or additionally, as shown in FIG. 9c, the portion of the key 253a engaged in the slot may be at least partially covered by pads 253b that is made of material that is softer than the material of element 253a that cushions the collisions between the key and the slot wall.

FIG. 9d illustrates an embodiment of shaft 260 attached to HMP element 261, by an articulating key that is comprised of pin 262 and block 263. Block 263 is received in slot 264 with a slip fit. In this configuration, element 261 has latitude to move axially because block 63 may slide readily in slot 264. At the same time element 261 may twist about the axis of pin 262. With the tighter tolerance between the key and the slot in which it is received, impact forces will be reduced.

FIG. 9e illustrates shaft 270 attached to HMP element 271 by means of modified Woodruff key 272 and block 273 that is received in slot 274. The modified Woodruff key has an increased bearing surface in the shaft compared to the arrangement in FIG. 9d.

Figure 9F:
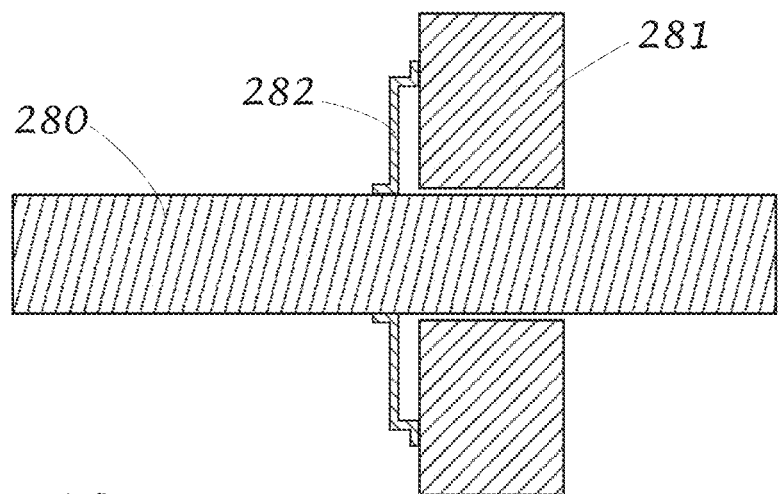
FIG. 9f illustrates a sectioned view of a shaft/rotor interface with a flexible disc torque-transferring element.
Figure 9G:
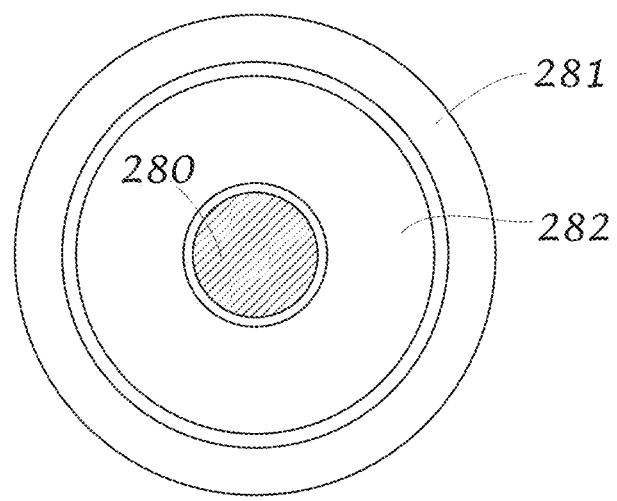
FIG. 9g illustrates a partially sectioned end view of a shaft/rotor interface of FIG. 9f.

FIG. 9f illustrates a sectioned side view of shaft 280 attached to HMP element 281 by means of flexible disc 282. Flexible disc 282 is torsionally stiff but accommodates relative twisting and axial movement between shaft 80 and element 281. FIG. 9g illustrates an end view of the apparatus in FIG. 9f.

Figure 10A:
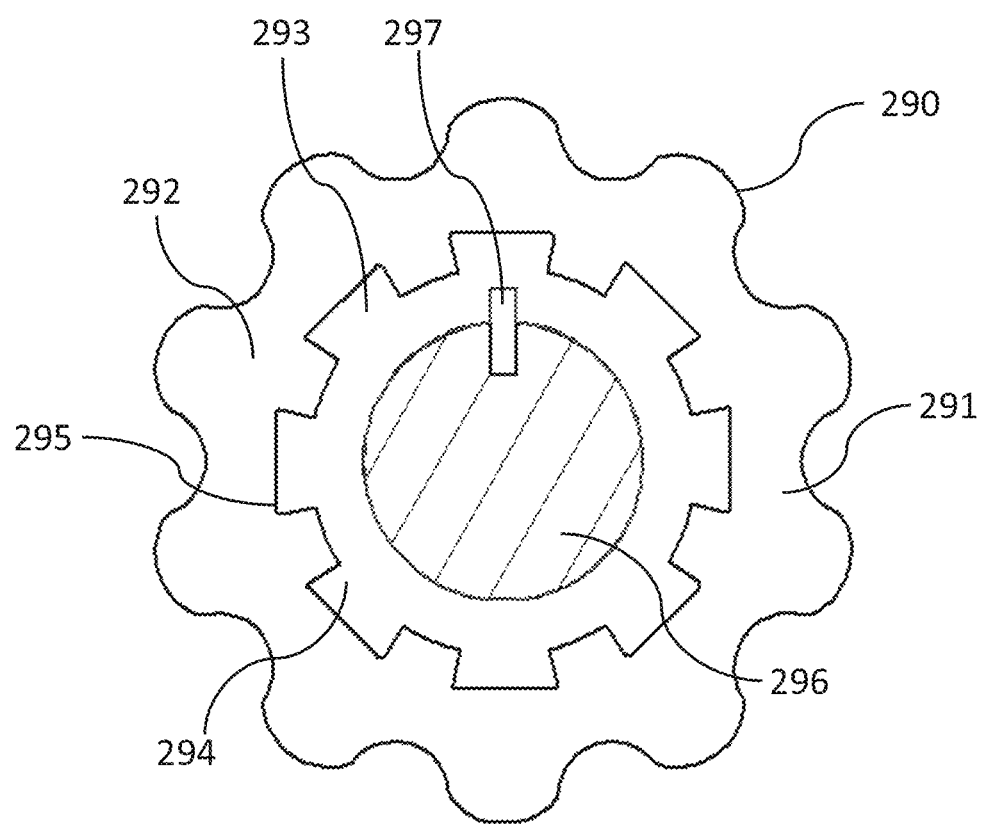
FIG. 10a illustrates a partially sectioned end view of an inner rotor of a gerotor with a multi-tooth hub.

FIG. 10a illustrates the inner rotor 290 of a gerotor with outer ring 291 with ten external rotor lobes 292 that engage the lobes of an outer rotor (not shown). Rotor 290 is shown with ten lobes but inner rotors with a different number of lobes and with different lobe profiles may be used. Annular hub 293 has external hub teeth 294 that closely engage the matching openings 295 in the inside annular surface of outer ring 291 that are configured to receive hub teeth 294. In the embodiment shown in FIG. 10a the hub is shown with eight teeth that engage the outer ring 291. In the embodiment in FIG. 10a the sides, of teeth 294, that engage the sides of openings 295, taper from a smaller cross sectional area, proximate to the annular hub, to a larger distal cross sectional area. Shaft 296 is connected to hub 293 by means of torque-transfer element 297.

Figure 10B:
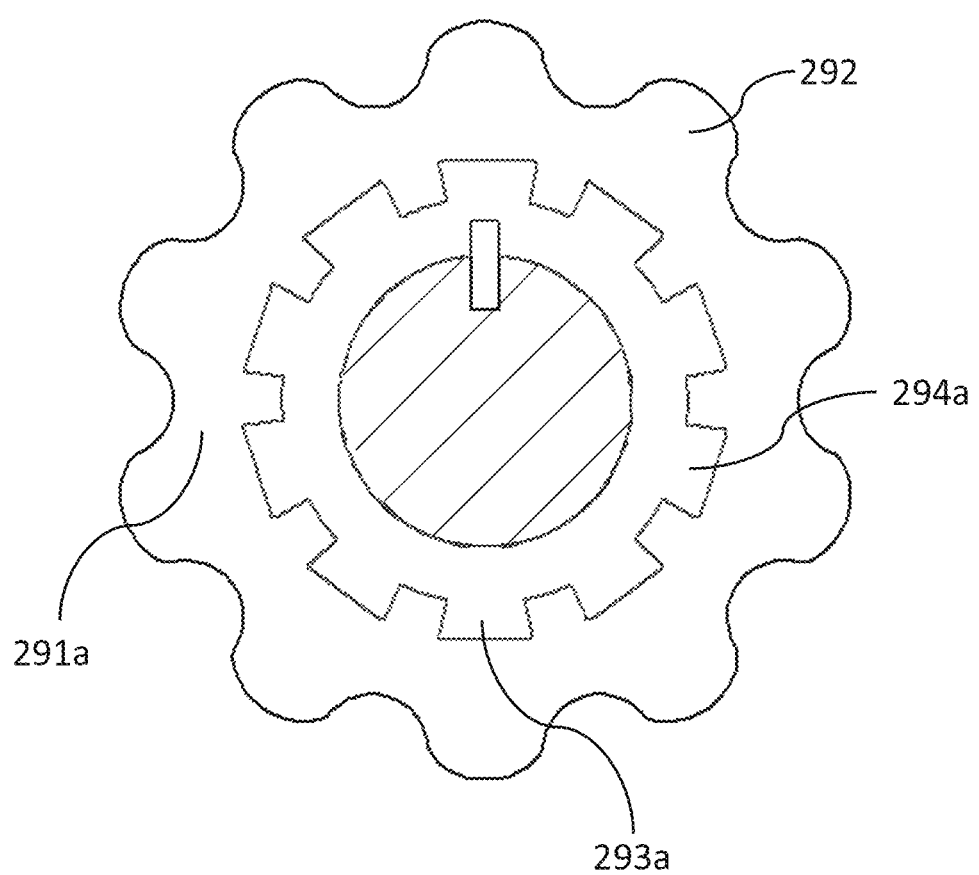
FIG. 10b illustrates another partially sectioned end view of an inner rotor of a gerotor with a multi-tooth inner hub.

In the embodiment illustrated in FIG. 10b, the number of hub teeth 294a is equal to the number of external rotor lobes 292. The hub teeth 294a may be aligned with external rotor teeth 292. A more uniform wall thickness in outer ring 291a may be achieved by aligning the hub teeth and the outer ring lobes. In some embodiments, the outer ring 291a may be made of a plastic material, such as, the performance plastic Meldin®, produced by Saint-Gobain. The outer ring 291a may be fabricated by, for example, an injection molding process. In some embodiments, the hub 93a may be manufactured from a material that has a yield strength that is comparable to the shaft material. Other manufacturing techniques and/or materials may be used for the outer ring and the hub.

Figure 10C:
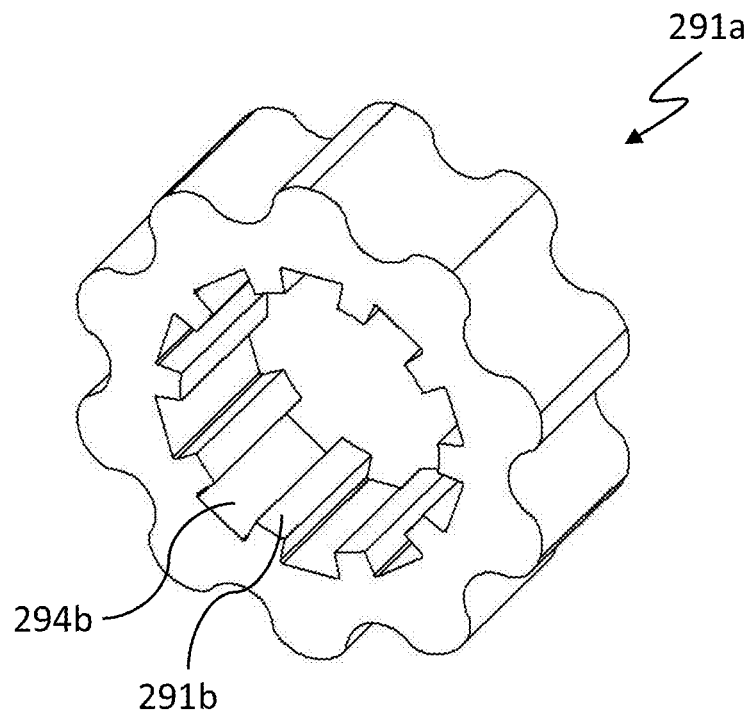
FIG. 10c illustrates a perspective view of an inner rotor of a gerotor configured to receive a hub.
Figure 10D:
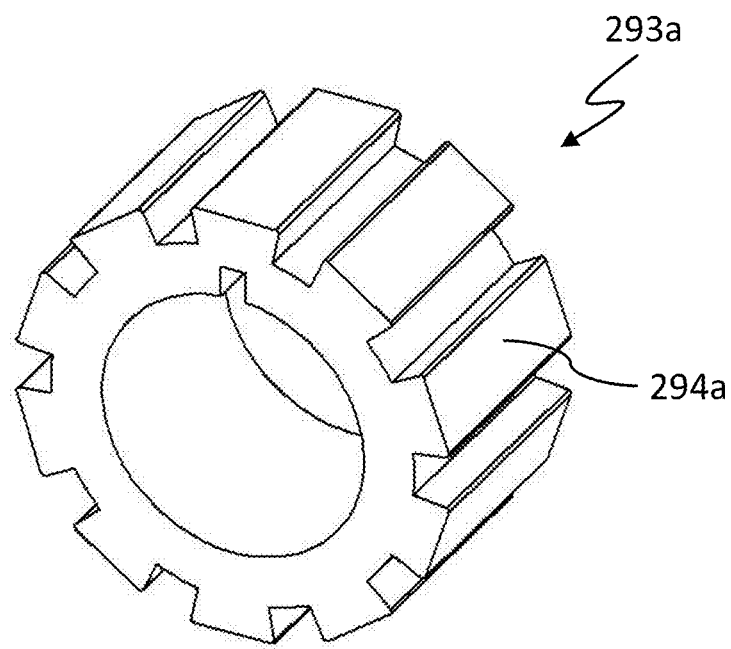
FIG. 10d illustrates a perspective view of a hub configured to be received in the opening of the rotor in FIG. 10c.
Figure 10E:
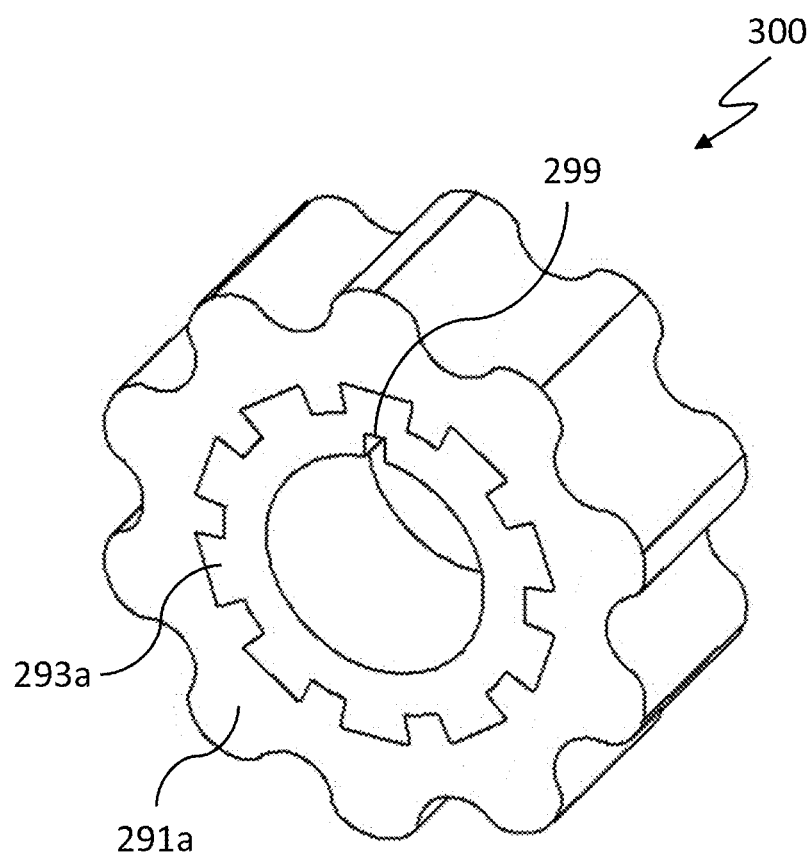
FIG. 10e illustrates a perspective view of a hub an assembly consisting of the rotor and hub shown in FIGS. 10c and 10d respectively.

FIG. 10c illustrates the outer ring 291a of an inner rotor. Opening 291b is configured to receive hub 293a shown in FIG. 10 d. Hub 93a comprises multiple teeth 294a with longitudinal axes that are parallel to the longitudinal axis of the hub. The fit between outer ring 291a and hub 293a may be a line-to-line fit. In some embodiments, the fit may be a transition fit and still more or an interference fit. FIG. 10e illustrated the inner rotor assembly 300 comprising outer ring 291a and hub 293a. Slot 299 is configured to receive a torque-transferring element connecting assembly 300 to a shaft (not shown). The assembly 100 may be fabricated by properly aligning hub 293a with opening 291b in outer ring 291a and pressing the two pieces together. Alternatively, assembly 300 may be manufactured by an over-molding process where a plastic outer ring is injection molded over a hub made of the same or different material. Alternatively or additionally, the outer rotor may be manufactured by an over-molding process where a plastic material is injection molded over an insert made of the same or different material. The different material may be a metal, such as for example, aluminum.

Figure 11B:
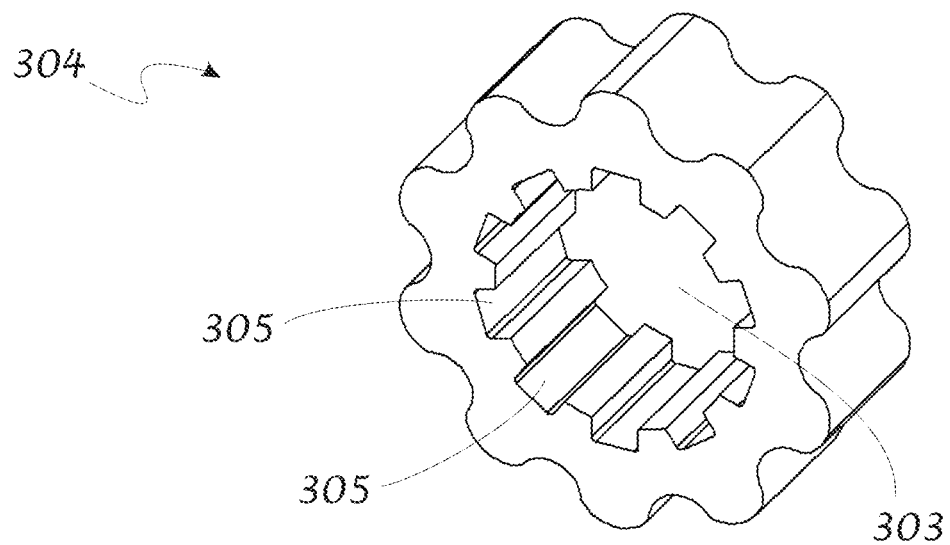
Figure 11A:
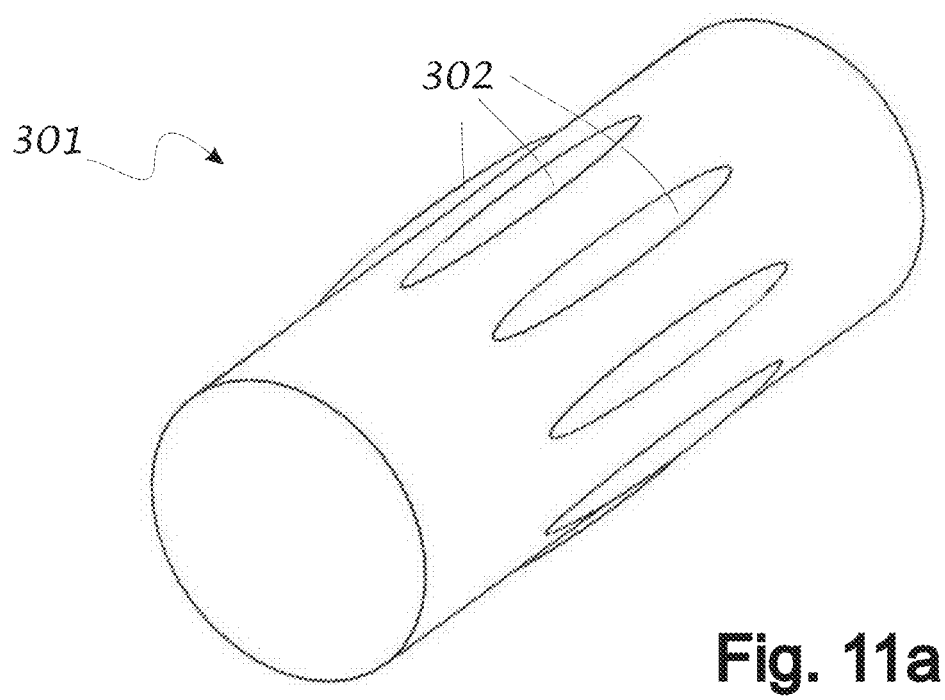
FIG. 11a illustrates a perspective view of a shaft with barrel shaped splines.

FIG. 11a illustrates an alternative way of connecting a shaft to an inner rotor of a gerotor so that it is torsionally stiff while floating in the axial and/or twist directions. FIG. 12a illustrates a shaft 301 with splines 302. In the embodiment shown in FIG. 11a, splines 302 have a barrel shaped cross section in the tangential plane and a half barrel shaped cross section in the radial plane. The splined shaft is slideably received in opening 303 of rotor 304, shown in FIG. 11b, such that splines 302 are received in axial slots 305. FIGS. 11a-11c and 12a-12b, illustrate the interface of a shaft with an inner rotor of a gerotor based HMP. These interfaces may be used to connect and HMP shaft to other types of HMP rotating elements that are driven by the shaft.

Figure 11C:
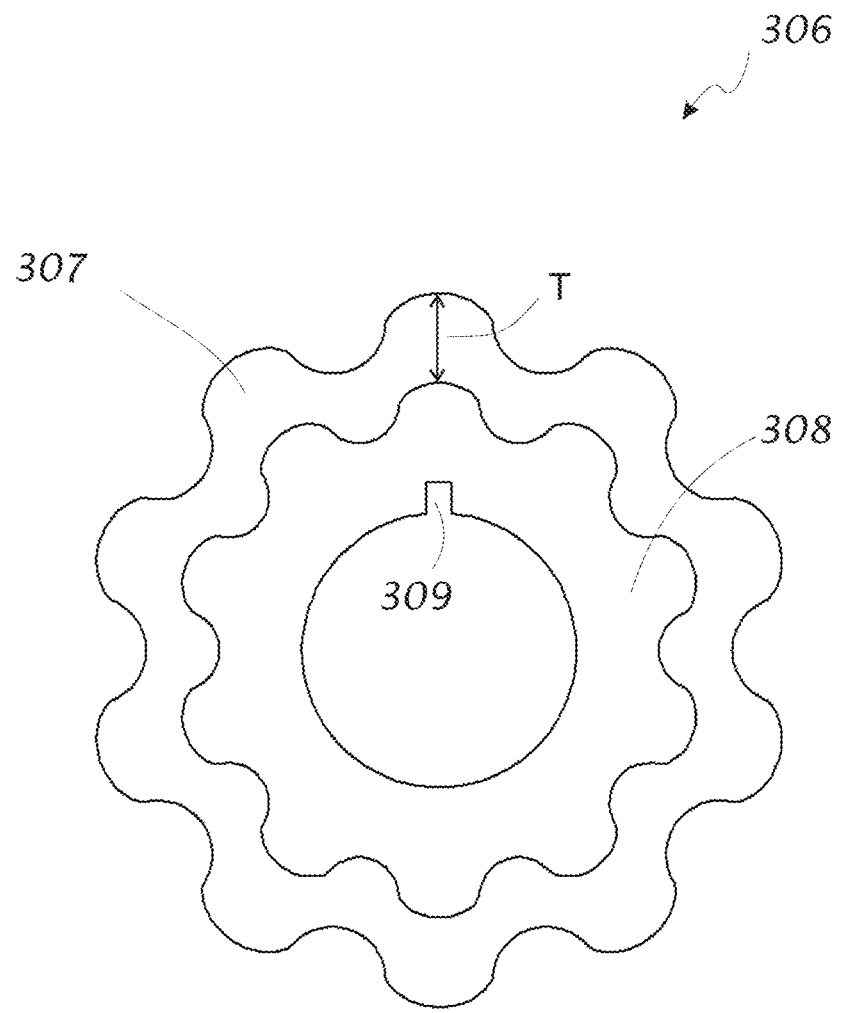
FIG. 11c illustrates a front view of a rotor fabricated by over molding an outer ring over a hub.

FIG. 11c illustrates a rotor 306 that is fabricated by over molding an outer ring 307 over hub 308. In some embodiments, keyway 309 in the hub may be used to interface the rotor 306 with a shaft (not shown). In some embodiments, a multiple slots (not shown) may be used to interface the rotor with a splined shaft.

The hub 308 insert may be shaped to maintain a substantially uniform wall thickness in the injection molded outer ring 307 in order to facilitate the flow and cooling of the injected material. The injected material may be a plastic while the hub may be made of a different material, such as for example, steel or aluminum. Alternatively, the hub insert may be made of the same material as the injection molded (over molded) outer ring. The hub insert may be manufactured by injection molding (if it is made of a material that can be injected) or other processes, such as for example, casting, sintering or extruding.

The variability of the wall thickness T of the outer ring, is defined as the maximum change in T divided by the maximum value of T, represented in percent. In some embodiments the variability is less than 33%. The variability in wall thickness may be set by selecting and aligning the outer profile of the hub 308 relative to the injection molded outer profile of the rotor 306. In some embodiments, the variability in wall thickness may be kept below 25%. In other, embodiments the variability may be kept below 10% or 5%.

Figure 12:
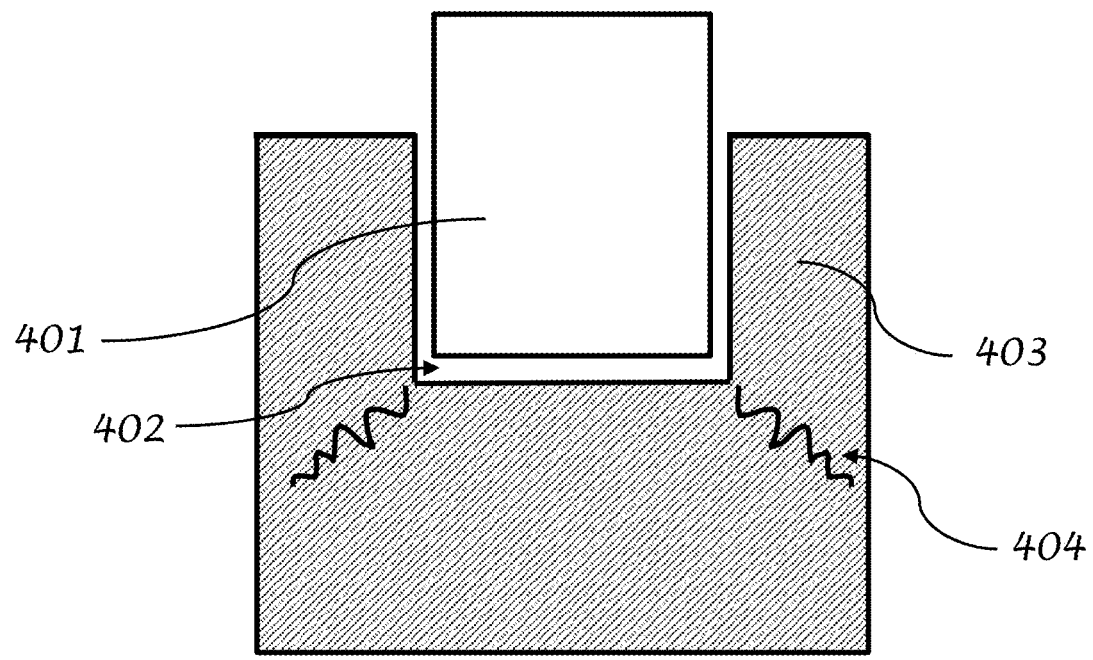
FIG. 12 illustrates a keyway with stress risers caused by sharp corners.

FIG. 12 depicts an embodiment of a keyway 402 in a rotary element 403, which is rectangular in cross-section with sharp corners. Key 401 is inserted into keyway 402 in rotary element 403 to interface with a shaft (not shown). Cracks 404 may form due to stress concentrations caused by the sharp corners in a conventionally shaped keyway.

Figure 13:
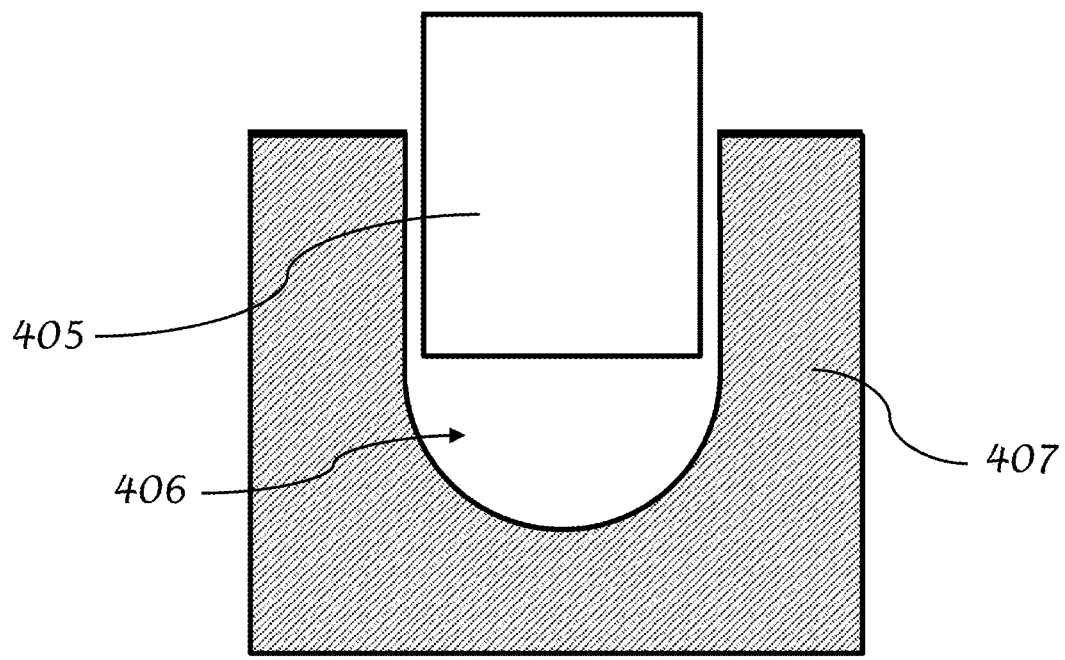
FIG. 13 illustrates a keyway with rounded corners.

In the embodiment shown in FIG. 13, the keyway 406 is constructed with maximally rounded corners. The keyway has a maximally rounded bottom when it is fully rounded and the fillet radius is equal to the nominal half the thickness of the key. This rounded keyway 406 reduces the stress concentrations in the rotary element 407, which may be a gerotor. The rounded feature in the keyway may be machined using for example, an end mill, a ball end mill or a rounded profile broach.

Figure 14:
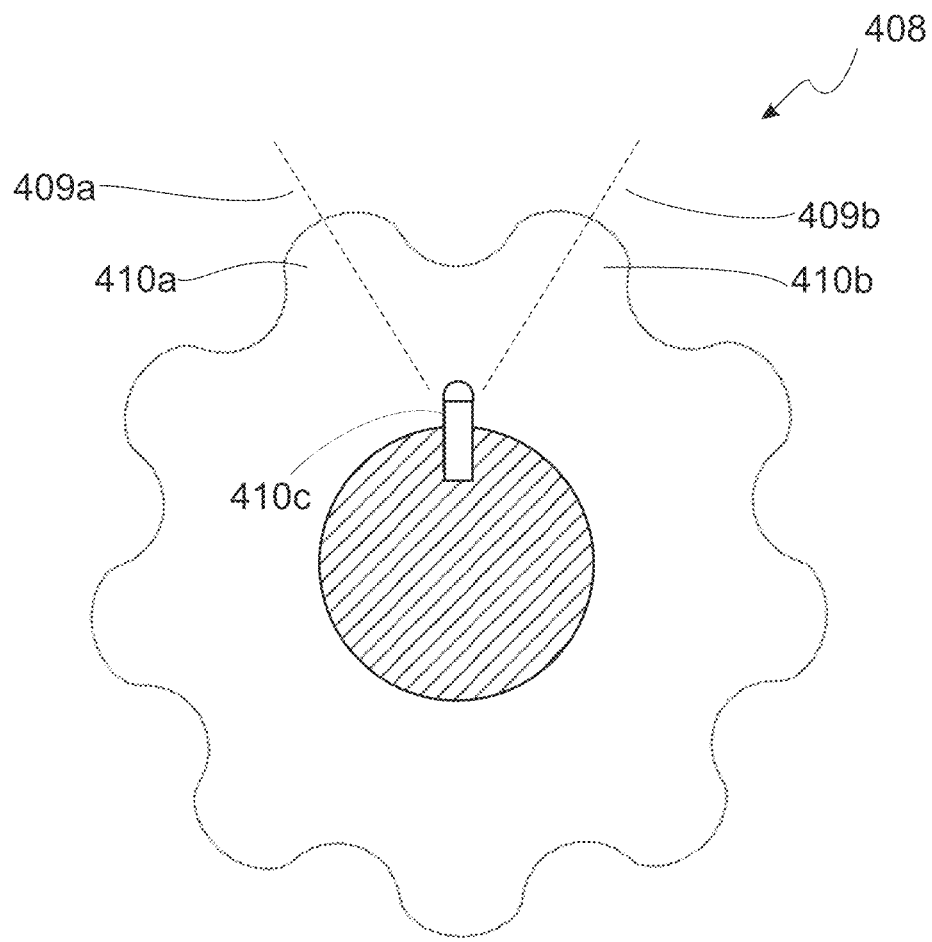
FIG. 14 illustrates a keyway located at a position where stress risers line up with rotor lobes.

FIG. 14 depicts an embodiment where an inner gerotor 408 with a keyway is positioned where the loci of max stress 409a and 409b are aligned with lobes 410a and 410b. When the loci of maximum stress are known, they may be aligned with the maximum thickness of the material of the rotary element. The position for keyway 410c in the embodiment in FIG. 14, is located on the inner cylindrical face of the inner gerotor halfway between two lobes. Forming the keyway at this location allows the stress created at the keyway to be accommodated in a portion with a thickest cross-section.

Figure 15:
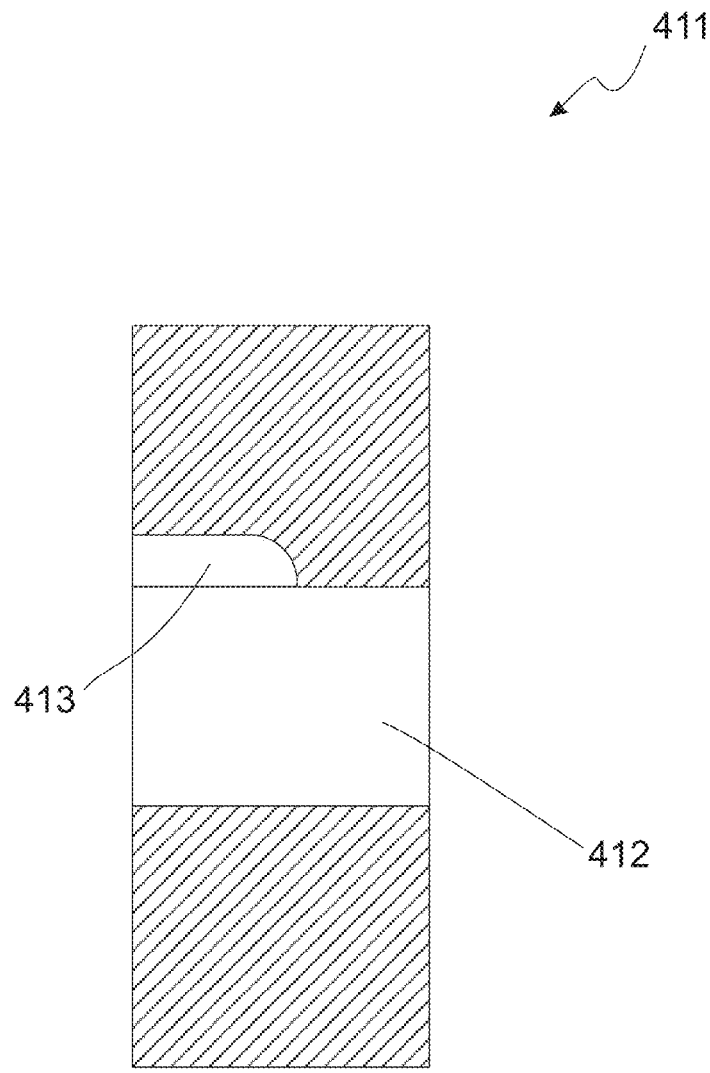
FIG. 15 illustrates a blind keyway.

FIG. 15 illustrates the cross-sectioned side-view of a rotary element 411 with opening 412 for receiving a drive shaft (not shown). Blind keyway 413 is constructed with a rounded end. In embodiments, the radius of the rounded end be greater than 0.010 inches or greater. In other embodiments this radius may be greater than 0.050 inches or greater. In other embodiments this radius may be 0.100 inches or greater. The radius of the rounded end may be made at least equal to or greater than half the nominal thickness of the key.

Figure 16A:
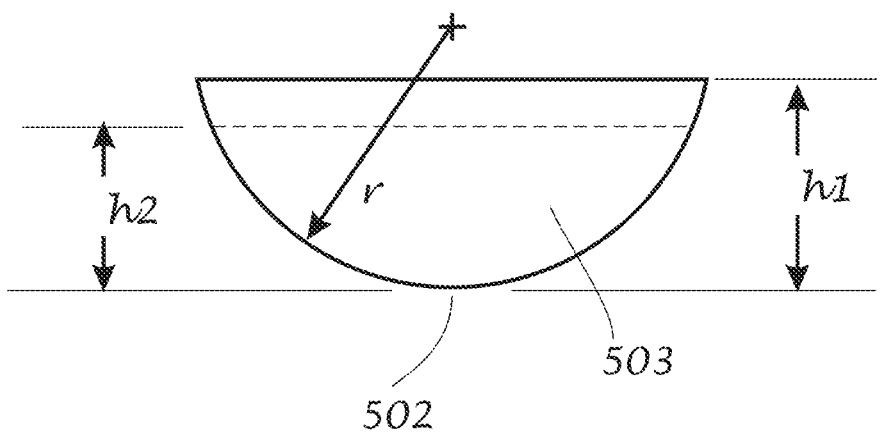
FIG. 16a illustrates the front view of a conventional woodruff key.
Figure 16B:
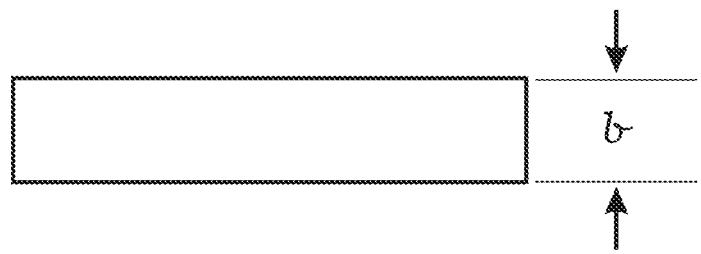
FIG. 16b illustrates the top view of a conventional woodruff key.

FIG. 16a illustrates the front view of a conventional woodruff key 501. Surface 502 is a segment of a circular cylinder with radius "r" which is typically greater than the height "$h_1$" of the woodruff key. Height "$h_2$" is the portion 503, of the key 501, that typically engages the shaft. FIG. 16b illustrates the top view of the key 1 showing width "b."

Figure 16C:
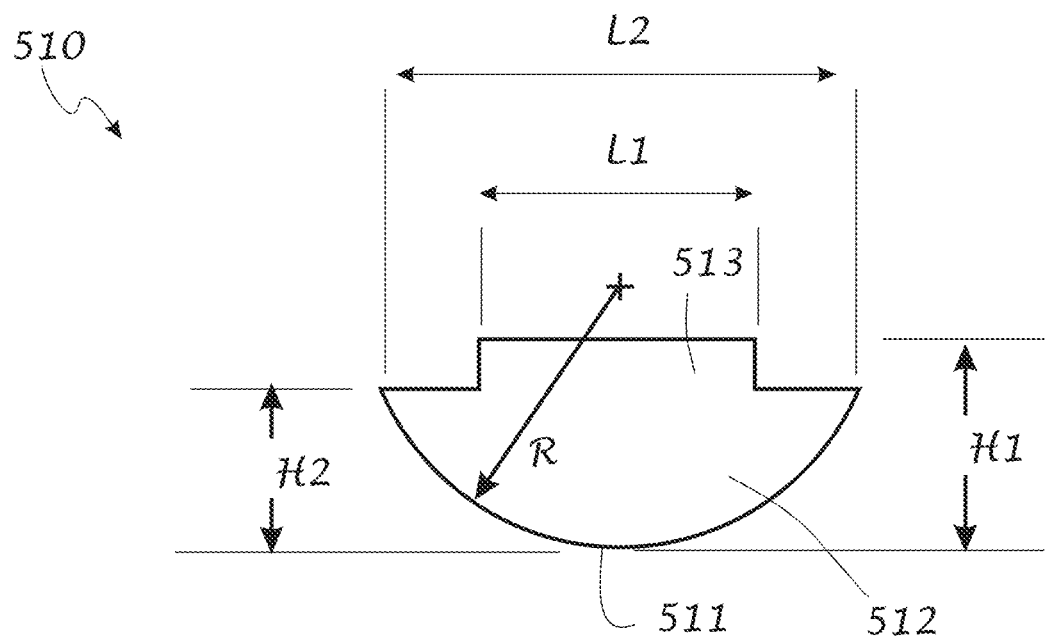
FIG. 16c illustrates the front view of an embodiment of a modified key.
Figure 16D:
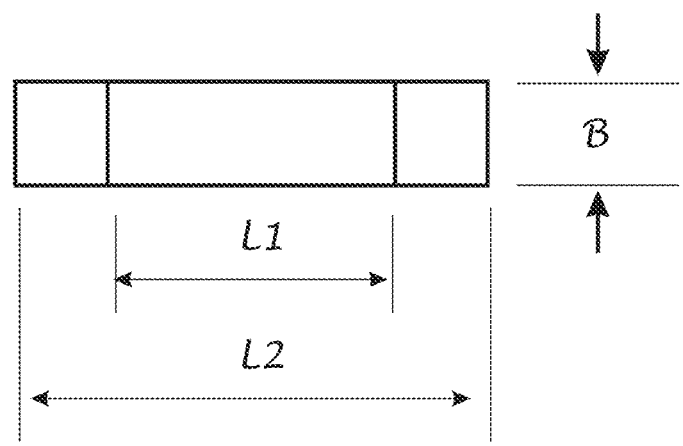
FIG. 16d illustrates the top view of the embodiment in FIG. 2c.

FIG. 16c depicts an embodiment of a modified woodruff key 510. Surface 511 is a segment of a circular cylinder with radius "R" which is typically greater than the height "$H_1$" of the woodruff key. Height "$H_2$" is the portion 512, of the key 510, that typically engages the shaft. Portion 513 of the key (with height equal to $H_1$-$H_2$), which engages the rotary element, has an axial length $L_1$ that is shorter than the axial length $L_2$ of portion 512. FIG. 1b illustrates the top view of the key 511 and its width "B." The engagement depth $H_2$ be as large as possible in order to prevent the key from being dislodged when used under conditions of high load and high acceleration.

However, it may be desirable to reduce the axial length L1 of the portion 513 of the key that engages the rotary element. By reducing the length L1 relative to L2, the maximum axial length of the portion 512, and/or increasing the clearance between the width B, shown in FIG. 17d and the width of the keyway in the rotary element (not shown) it is possible to increase the latitude of the rotary element to move relative to the shaft that it is coupled to.

Figure 17:
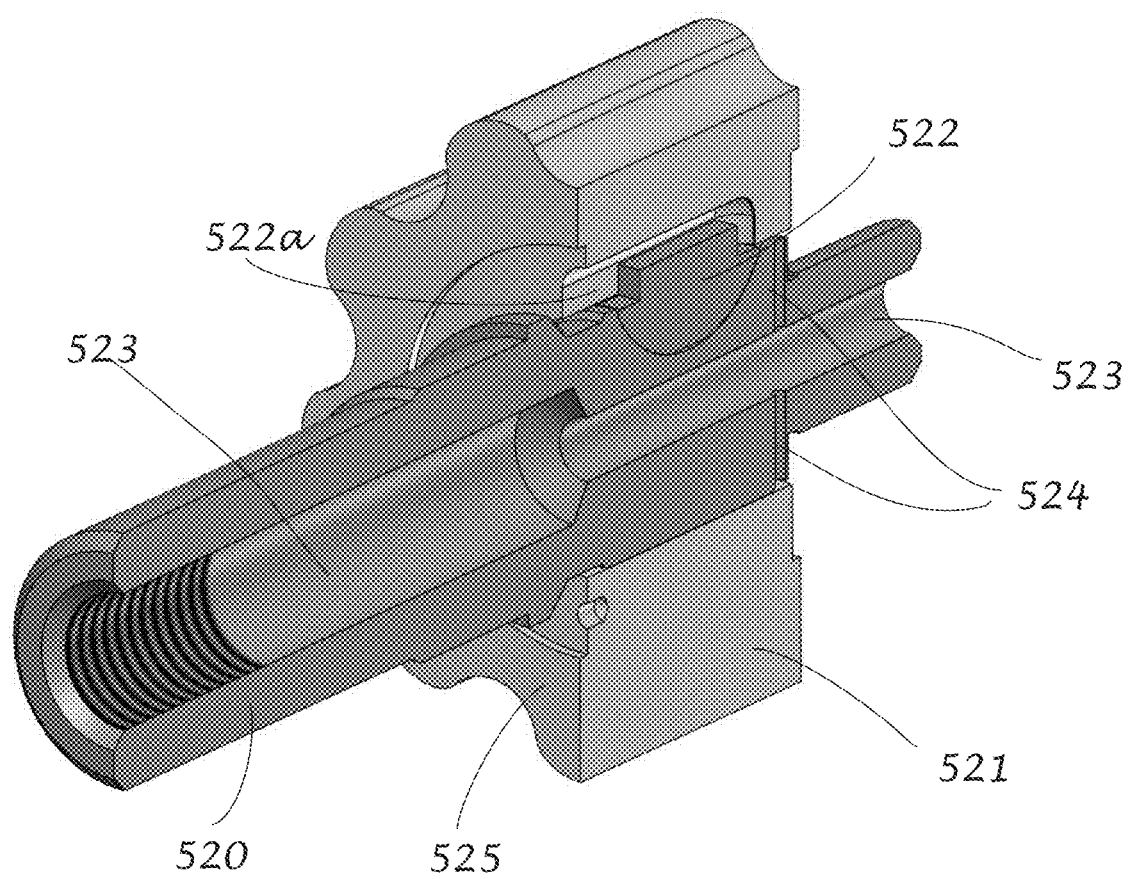
FIG. 17 illustrates an embodiment of a shaft interface with a rotary element.

FIG. 17 shows a sectioned perspective view of a shaft 520 coupled to rotary element 521 by means of modified woodruff key 522. The woodruff key engages the rotary element 521 by means of keyway 522a. Axial conduit 523 and radial conduit 524 may be used to equalize the pressure on the front face 525 and rear face (not shown) of rotary element 521.

Figure 18:
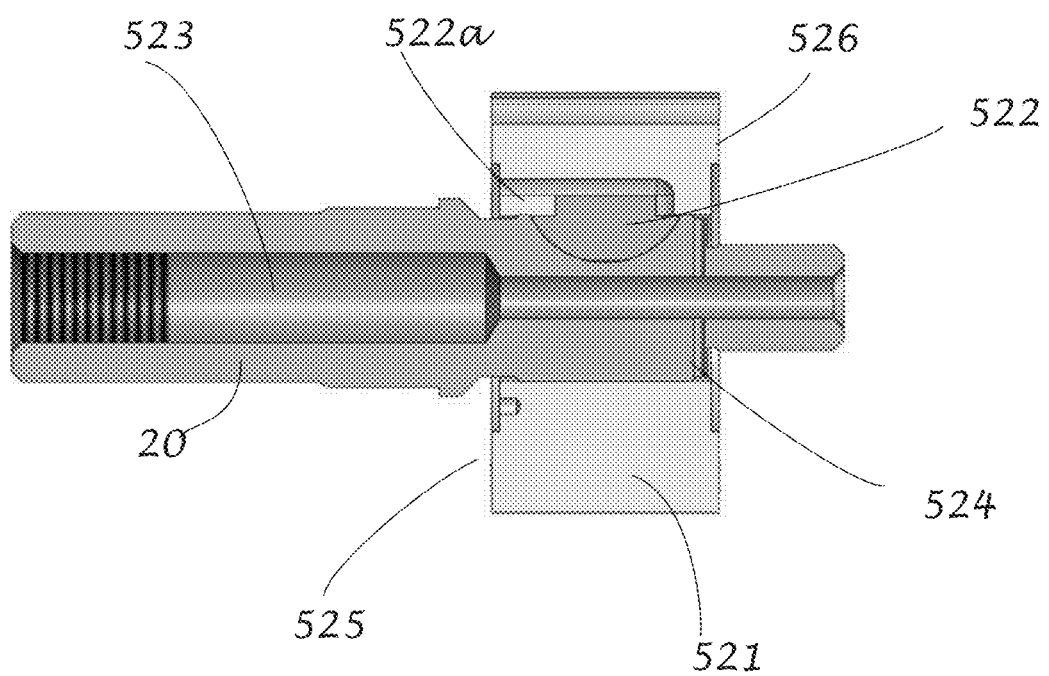
FIG. 18 illustrates an embodiment of a shaft coupled to a rotary element with the key shown in FIG. 1c.

FIG. 18 shows a sectioned side view the apparatus in FIG. 17. Axial conduit 523 and radial conduit 524 may be used to equalize the fluid pressure on the front face 525 and rear face 526 of rotary element 521.

Figure 19A:
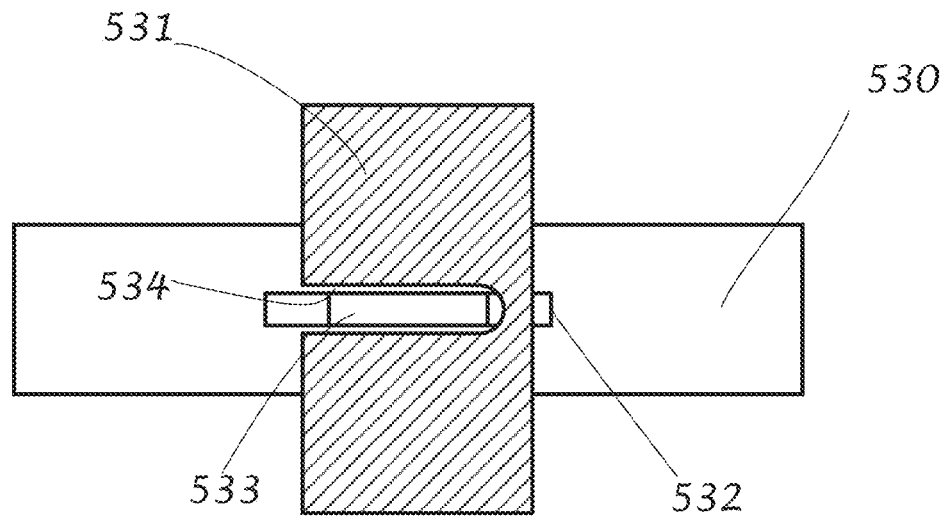
FIG. 19a illustrates a schematic of another embodiment of shaft coupled to a rotary element.
Figure 19B:
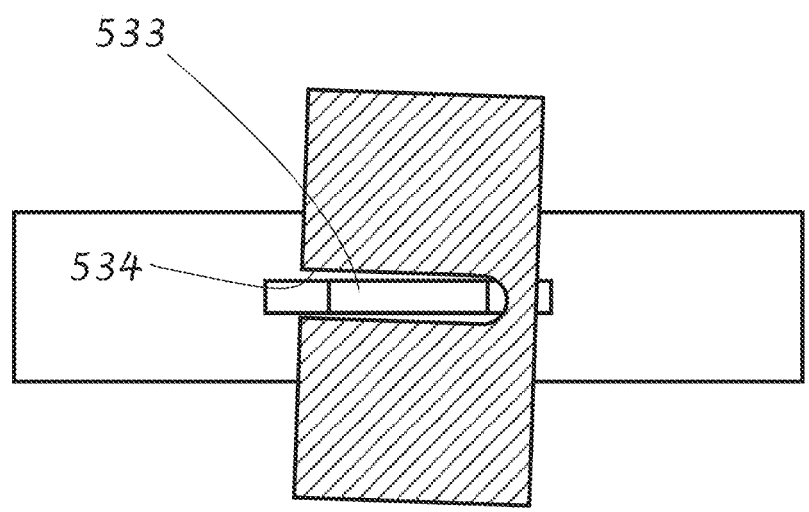
FIG. 19b illustrates a schematic of the embodiment of shaft coupled to a rotary element where the rotary element has pivoted about a radial axis.

FIG. 19a shows a top view of shaft 530 coupled to rotary element 531 (shown in section) by means of key 532. Upper portion 533 of key 532 engages keyway 534 in rotary element 531. The rotary element 531 may be made to "float" relative to shaft 530. Float is defined as the latitude of the rotary element to move a slight amount, i.e. sufficiently to self-align relative to other element(s) of the apparatus, such as for example the housing of the apparatus. In the embodiment in FIGS. 19a and 19b the rotary element is constructed to float relative to the shaft by limiting the maximum axial length of portion 533 to be less than the axial thickness of rotary element 531 and by limiting the thickness of the upper portion 533 to be less than the thickness of keyway 34 so that there is a clearance fit. FIG. 19b shows the shaft 530 and rotary element 531 shown in FIG. 19a, where the rotary element has moved relative to the shaft. In FIG. 19b, the axis of the rotary element is at an angle to the axis of the shaft. The rotary element is able to "float" because of the clearance between the upper portion 533 and the keyway 534 and/or because the axial length of the upper portion is less than the axial thickness of the rotary element. Keys other than a modified woodruff key may be used to couple the shaft to the rotary element.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method of operating a hydraulic motor pump, comprising:
   determining an angular speed of the hydraulic motor pump;
   receiving a command torque request;
   determining that the command torque request is within an unacceptable range of torque for the angular speed; and
   in response to the determination that the command torque request is within the unacceptable range of torque for the angular speed, applying an applied torque to the hydraulic motor pump that is within an acceptable range of torque for the angular speed.

2. The method of claim 1 wherein applying the applied torque to the hydraulic motor pump comprises applying the applied torque with one of an electric motor and an electric generator.

3. The method of claim 1 wherein operating in the acceptable range produces less noise than operating in the unacceptable range.

4. The method of claim 1, further comprising obtaining a map that includes the acceptable range and the unacceptable range.

5. The method of claim 1, wherein the hydraulic motor pump is located in a vehicle and wherein operating in the acceptable range excites a resonance of the vehicle less than operating in the unacceptable range.

6. The method of claim 1, wherein the applied torque is within an optimal range of torque for the angular speed.

7. A hydraulic system, comprising:
   a hydraulic motor pump;
   an electric motor/generator operatively coupled to the hydraulic motor pump;
   a data storage that includes a map with at least one unacceptable range of torque for an angular speed; and
   a controller configured to respond to a request for a torque in the at least one unacceptable range for a given speed by commanding the electric motor/generator to apply a torque to the hydraulic motor pump that is in an acceptable range at the angular speed.

8. The hydraulic system of claim 7, wherein the map further includes an acceptable range of torque for the angular speed and an optimal range of torque for the angular speed, and wherein the optimal range is included within the acceptable range.

9. The hydraulic system of claim 8 wherein the applied torque is within the optimal range.

10. The hydraulic system of claim 7, wherein the hydraulic system is located in a vehicle and wherein operation of the hydraulic motor pump in the at least one unacceptable range results in an excitation of a resonance of the vehicle with a first intensity, and wherein operation of the hydraulic motor pump in the acceptable range results in an excitation of the resonance of the vehicle with a second intensity that is less than the first intensity.

11. The hydraulic system of claim 7, wherein operation of the hydraulic motor pump in the at least one unacceptable range produces noise to a first degree, and wherein operation of the hydraulic motor pump in the acceptable range produces noise to a second degree that is less than the first degree.

12. A method of operating a hydraulic motor pump, comprising:
   determining an angular speed of the hydraulic motor pump;
   receiving a first command torque request;
   determining that the first command torque would excite a first level of resonance if applied to the hydraulic motor pump; and
   in response to determining that the first command torque would excite the first level of resonance if applied to the hydraulic motor pump:

determining a second command torque that would excite a second level of resonance if applied to the hydraulic motor pump, wherein the second level of resonance is less than the first level of resonance; and applying the second command torque to the hydraulic motor pump.

13. The method of claim 12, wherein applying the second command torque to the hydraulic motor pump comprises applying the second command torque with one of an electric motor and an electric generator.

14. The method of claim 12, wherein determining that the first command torque would excite the first level of resonance if applied to the hydraulic motor pump comprises:

identifying an unacceptable range of torque for the angular speed; and determining that the first command torque request is within the unacceptable range of torque for the angular speed.

15. The method of claim 14, further comprising obtaining a map that includes the unacceptable range and an acceptable range.

16. The method of claim 15, wherein the acceptable range includes an optimal range.

17. The method of claim 15, wherein the second command torque is within the acceptable range.

18. The method of claim 16, wherein the second command torque is within the optimal range.

19. The method of claim 12, wherein the second command torque is higher than the first command torque.

* * * * *